United States Patent
Rao

(10) Patent No.: US 11,615,218 B2
(45) Date of Patent: Mar. 28, 2023

(54) MESH VOID SPACE IDENTIFICATION AND AUTO SEEDING DETECTION IN COMPUTER ADDED DESIGN DEFINED GEOMETRIES

(71) Applicant: Dassault Systemes Simulia Corp., Johnston, RI (US)

(72) Inventor: Kaustubh Rao, South Kingstown, RI (US)

(73) Assignee: Dassault Systemes Simulia Corp., Johnston, RI (US)

( * ) Notice: Subject to any disclaimer, the term of this patent is extended or adjusted under 35 U.S.C. 154(b) by 358 days.

(21) Appl. No.: 16/874,977

(22) Filed: May 15, 2020

(65) Prior Publication Data

US 2021/0357541 A1 Nov. 18, 2021

(51) Int. Cl.
G06F 30/10 (2020.01)
G06F 30/28 (2020.01)
G06F 111/10 (2020.01)

(52) U.S. Cl.
CPC .............. *G06F 30/10* (2020.01); *G06F 30/28* (2020.01); *G06F 2111/10* (2020.01)

(58) Field of Classification Search
CPC ....... G06F 30/10; G06F 30/28; G06F 2111/10
See application file for complete search history.

(56) References Cited

U.S. PATENT DOCUMENTS

| 5,594,671 | A | 1/1997 | Chen et al. |
| 6,256,038 | B1 * | 7/2001 | Krishnamurthy ..... G06T 11/203 345/582 |
| 7,558,714 | B2 | 7/2009 | Shan et al. |
| 2004/0174362 | A1 | 9/2004 | Celniker |
| 2009/0322749 | A1 | 12/2009 | Kassab et al. |
| 2012/0029894 | A1 | 2/2012 | Okutani |
| 2013/0151221 | A1 | 6/2013 | Chen et al. |
| 2013/0332127 | A1 * | 12/2013 | Favier et al. ....... G06F 17/5009 703/6 |
| 2016/0124117 | A1 | 5/2016 | Huang et al. |
| 2016/0152314 | A1 | 6/2016 | Carlsten |

(Continued)

FOREIGN PATENT DOCUMENTS

JP H027173 A 1/1990

OTHER PUBLICATIONS

Jensen et al. "HULK—Simple and fast generation of structured hexahedral meshes for improved subsurface simulations" CHYN—Centre for Hydrogeology and Geothermics, Laboratory of Geothermics and Geodynamics, University of Neuchatel, Switzerland (Year: 2016).*

(Continued)

*Primary Examiner* — Andre Pierre Louis
(74) *Attorney, Agent, or Firm* — Fish & Richardson P.C.

(57) ABSTRACT

Described are computer implemented techniques to select a single surface of a computer aided design (CAD) as a surface that shares a boundary with a void space that will be discretized, produce a virtual geometry item that is positioned within or about the void region to define the volume to be discretization and propagate a mesh within the defined volume by discretizing the CAD generated geometry by a discretization factor to find a first valid seed point within the CAD generated geometry that satisfies all virtual geometries taken together.

20 Claims, 16 Drawing Sheets

(56) References Cited

U.S. PATENT DOCUMENTS

| | | | | |
|---|---|---|---|---|
| 2017/0185707 A1* | 6/2017 | Rao et al. | ............... | G06F 30/23 703/2 |
| 2019/0134915 A1* | 5/2019 | Schmidt et al. | ...... | B29C 64/393 701/98 |
| 2020/0034497 A1 | 1/2020 | Goswami et al. | | |

OTHER PUBLICATIONS

EP Extended Search Report in European Appln. No. 19188922, dated Dec. 20, 2019, 10 pages.
Penzkofer et al., "Visual analysis methods for non-ideal assemblies", Proceedings of DESIGN 2008, the 10th International Design Conference, May 19-22, 2008, Dubrovnik, Croatia, DS48:657-664.
Busaryev, et al. "Repairing and Meshing Imperfect Shapes with Delaunay Refinement", Oct. 4-9, 2009, SIAM/ACM Joint Conference on Geometric and Physical Modeling, ACM, 9 pages.
Extended European Search Report in European Appln No. 19188922. 9, dated Jul. 8, 2021, 4 pages.
Extended European Search Report in European Appln No. 21173809. 1, dated Sep. 23, 2021, 11 pages.
Jansen et al., "HULK—Simple and fast generation of structured hexahedral meshes for improved subsurface simulations," Computers & Geosciences, Nov. 27, 2016, vol. 99, pp. 159-170.
Kakosimos et al., "An efficient 3D mesh generator based on geometry decomposition," Computers and Structures, Jan. 1, 2009, 87(1-2):27-38.
Tierney et al, [online] "Tolerant geometric extraction of fluid domains to assist CFD analyses of aero-engines," AIAA SciTech 2019 Forum, Jan. 7, 2019, retrieved on Sep. 14, 2021, retrieved from URL<https://www.researchgate.net/profile/Chris-Tierney-4/publication/ 330196763_Tolerant_geometric_extraction_of_fluid_domains_to_ assist_CFD_analyses_of_aero-engines/links/ 5c3d9248299bf12be3c8b4cc/Tolerant-geometric-extraction-of-fluid-domains-to-assist-CFD-analyses-of-aero-engines.pdf>, 15 pages.
Response Surfaces: Designs and Analyses, 2nd edition, Revised and Expanded, 1996, 527 pages.

* cited by examiner

MESH VOID SPACE IDENTIFICATION AND AUTO SEEDING DETECTION IN COMPUTER ADDED DESIGN DEFINED GEOMETRIES

BACKGROUND

This disclosure relates to techniques to define geometries of objects.

Computer-aided design (CAD) is the use of computer systems to aid in the production, modification, analysis, or optimization of a design. Computer-aided design (CAD) has many applications. One application of CAD is that CAD drawings can serve as a basis for defining object geometries for fluid flow simulations.

Computational fluid dynamics (CFD) is a branch of fluid mechanics that solves problems involving fluid flows. In some implementations, computer systems perform calculations required to simulate the interaction of liquids and gases with surfaces defined by boundary conditions. Part of the process of performing the fluid simulation includes defining the geometry of objects relevant to the simulation. Frequently, the geometry can be defined using computer-aided design (CAD). For example, CAD systems can be used to define the geometry of the physical objects to simulate, such as a car, wind turbine, air duct, etc.

In the field of computational fluid dynamics (CFD), users are interested in meshing void space and gap space. For example, consider a hollow pipe. The pipe is geometrically represented as a cylinder with some thickness. The void space/gap inside hollow region of this pipe is the space that will be occupied by fluid. In order to perform a CFD simulation, this void space needs to be identified in order to fill the space with discrete computational points (mesh).

Users may also need to manipulate this void space. For example, users may need to only fill a symmetric half of this void space, with computational points (so as to reduce computational resources and time). Using the above pipe analogy, this would be akin to slicing the pipe along the pipe's length. It is also plausible the void space resulting from the CAD geometry maybe excessive and user may need to restrict or reduce the region of computation.

Current techniques to define the void space are manual, involving a tedious and cumbersome method to manipulate and describe the void space. In order to modify the void space, the user would need to modify the original part geometry (CAD representation). Modifying the part geometry is time consuming and may need to produce new enclosing surfaces (that will manipulate the void space) in order to split the space into two symmetric halves.

Another drawback apart from it being time consuming is that, the "CAD" representation is typically shared across various other simulations. This CAD would now have been permanently changed for the purposes of one simulation in a very simulation specific manner. This would automatically invalidate any results or simulation setups of all other simulations that refer to this now modified CAD.

Another drawback is that the user needs to explicitly state where the void space exists. This is done today by picking all the surfaces that enclose the void space. A problem with this methodology is that, if the void spaces are re-manipulated, the current description of the void space is no longer valid. That is, the current method of describing a void space by picking a set of enclosing surfaces, does not adapt to future manipulations of the void space.

Another problem is a design of experiment problem. In this type of problem, several simulation parameters, geometry configurations are subject to changes while being constrained in order to find the most optimal solution. Since geometry changes with each simulation experiment, so would the void space. It is then likely that for every simulation experiment the user would need to re-define the void space manually.

SUMMARY

The approaches described herein allow for a data processing system to auto-define and manipulate void space quickly and in a non-tedious manner. The data processing system allows a user to define and manipulate the void spaces without changing the CAD geometry thus retaining validity of all simulations that refer to the same CAD. The approaches defined herein allow the data processing system to auto detect the void space.

The disclosed techniques avoid manual approaches to manipulate and describe the void space. The disclosed techniques allow a user to modify the void space, without the user needing to modify the original part geometry (CAD representation). The approach allows the system to identify where the void spaces exist, thus avoiding problems associated with re-manipulated. This approach enables a design of experiment problem by permitting a user to avoid manual re-definition of the void space.

According to an aspect, a computer implemented method includes selecting a single surface of a computer aided design (CAD) as a surface that shares a boundary with a void space that will be discretized, producing a virtual geometry item that is positioned within or about the void region to define the volume to be discretization, and propagating a mesh within the defined volume by discretizing the CAD generated geometry by a discretization factor to find a first valid seed point within the CAD generated geometry that satisfies all virtual geometries taken together.

One or more of the features below are some of the additional features that may be included in the above aspect.

When the valid point is not found within the CAD generated geometry, which satisfies all bounding planes taken together, the method further includes refining the discretization by incrementing the discretization factor and repeating until a valid seed point is found. The method further includes identifying a void region in a computer aided design (CAD) generated geometry within which the mesh is applied. The method further includes storing information that defines and positions the virtual geometry in relation to the CAD parts. The virtual geometry item is a plane. The virtual geometry item is a box. The computer-implemented method performs a discretization of the volume. The computer-implemented method further includes performing a computational fluid dynamic simulation of the volume.

One or more of the above aspects may include one or more of the following advantages.

The process automatically detects the void space after having picked just one surface belonging to the void space. The user picks one surface after which the process seeks to automatically determine where the void space lies. This detection methodology takes into account all virtual geometries that exist. Subsequent to processing a mesh is fitted to the part under consideration.

The process auto computes valid regions where to mesh, by undertaking a very coarse discretization of the geometry to find a first valid seed point that satisfies all virtual bounding planes, and/or virtual boxes taken together. If solution is not found, the process refines discretization and repeats to a maximum number of attempts. If nothing is found then the setup of planes and boxes results in no solution.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Problems with current approaches to define and manipulate void space are that these approaches are mostly or completely manual processes.

Figure 1:
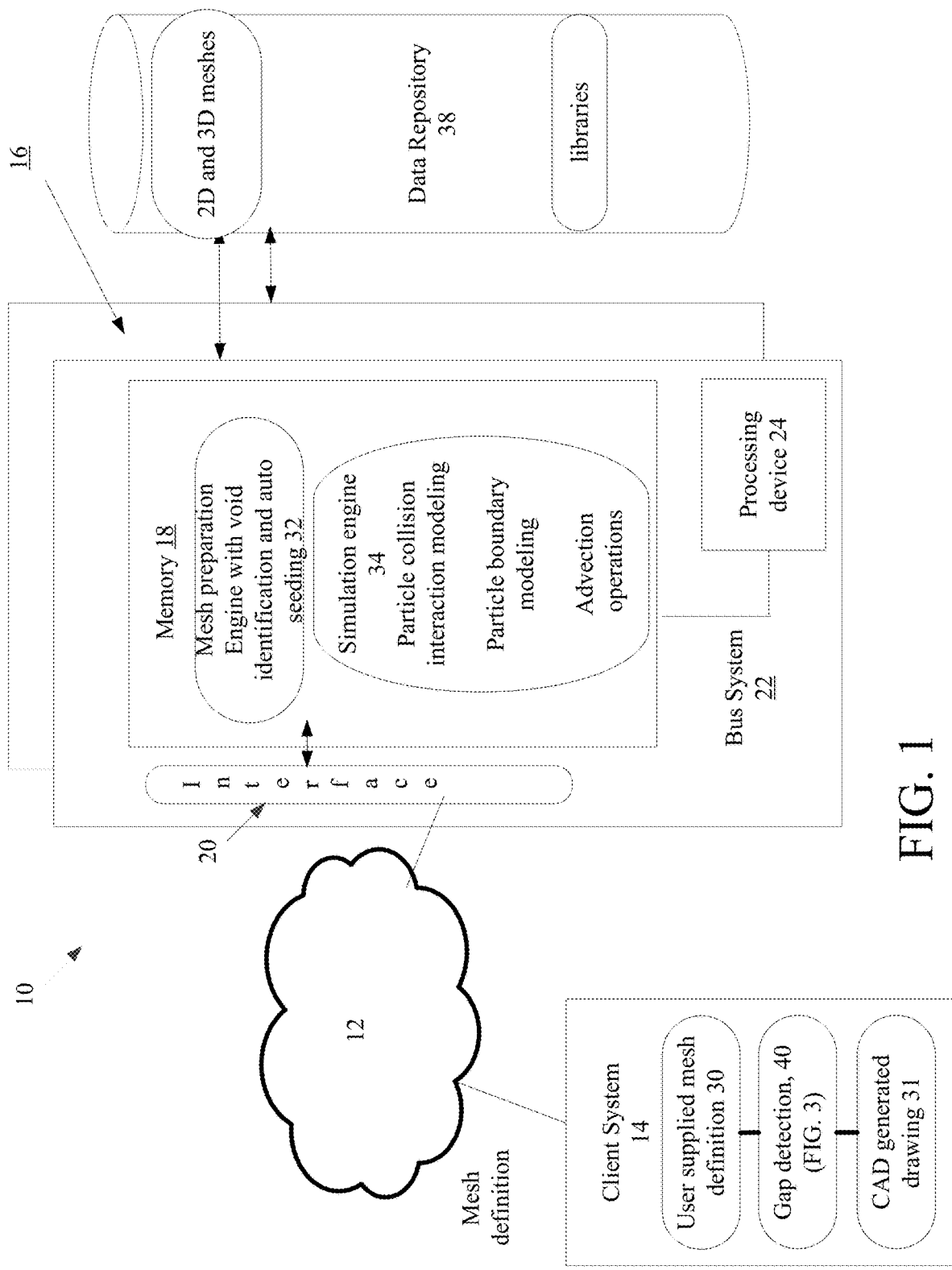
FIG. 1 depicts a system for simulation of fluid flows.

Referring to FIG. 1, a system 10 for simulating a fluid flow, e.g., about a representation of a physical object is shown. The system 10 in this implementation is based on a client-server architecture and includes a server system 12 implemented as a massively parallel computing system 12 and a client system 14. The server system 12 includes memory 18, a bus system 11, interfaces 20 (e.g., user interfaces/network interfaces/display or monitor interfaces, etc.) and a processing device 24. In memory 18, are a mesh preparation engine 32 and a simulation engine 34.

While FIG. 1 shows the mesh preparation engine 32 in memory 18, the mesh preparation engine can be a third party application that is executed on a different system than server 12. Whether the mesh preparation engine 32 executes in memory 18 or is executed on a different system than server 12, the mesh preparation engine 32 receives a user-supplied mesh definition 30 and the mesh preparation engine 32 prepares a mesh and sends the prepared mesh to the simulation engine 34. For an Lattice Boltzmann Method, the simulation engine 34 includes a particle collision interaction module, a particle boundary model module and advection module that performs advection operations. The system 10 accesses a data repository 38 that stores 2D and/or 3D meshes, e. g. produced as discussed herein, and libraries.

As mentioned above, this technique is useful for any physics simulation that requires a mesh, not limited to only LBM, but also works for FVM CFD, E-Mag, structural simulations etc.

Prior to execution of a simulation in the simulation engine, a simulation space is modeled as a collection of voxels. Typically, the simulation space is generated using a computer-aided-design (CAD) program. For example, a CAD program could be used to draw device positioned in a wind tunnel. Thereafter, data produced by the CAD program is processed to add a lattice structure having appropriate resolution and to account for objects and surfaces within the simulation space. As discussed above one of the challenges in use of CAD drawings to generate the simulation space includes problems dealing with both identification of and manipulate of the void space in CAD generated geometries.

Figure 2:
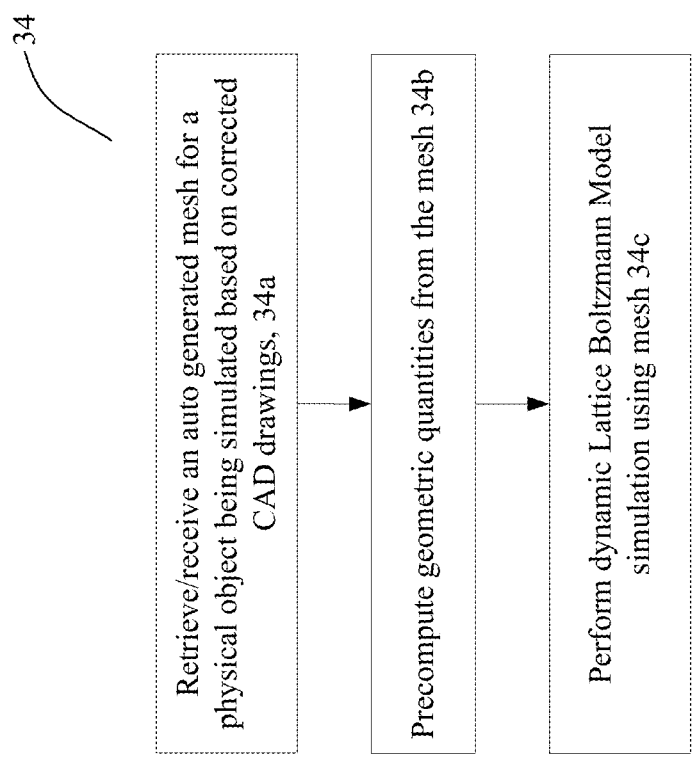
FIG. 2 depicts a flow chart showing operations for formulation of a Lattice Boltzmann Model simulation.

Referring now to FIG. 2, a process for simulating fluid flow about a representation of a physical object is shown. In the example that will be discussed herein, the physical object is a catalytic converter. The use of a catalytic converter is merely illustrative however, as the physical object can be of any shape, and in particular can have planar and/or curved surface(s) that at least partially enclose a region. The process receives, e.g., from client system 14 or by retrieval from the data repository 38, a mesh for the physical object being simulated. In other embodiments, either an external system or the server 12 based on user input, generates the mesh for the physical object being simulated. The process precomputes geometric quantities from the retrieved mesh and performs dynamic Lattice Boltzmann Model simulation using the precomputed geometric quantities corresponding to the retrieved mesh. Lattice Boltzmann Model simulation includes the simulation of evolution of particle distribution and advection of particles to a next cell $\bar{q}$ in the LBM mesh.

Discussed below will be a mesh construction engine that uses a computer aided design (CAD) for construction of CAD drawings of suitable quality. In essence, the mesh construction engine 32 seeks to describe a fluid region (void space), manipulate the fluid region by using virtual geometries and auto detect where the void space lies. The mesh construction engine can quickly manipulate as well as describe the void spaces. Three scenarios arise with the relative configuration of the void space and the CAD parts.

Figure 5:
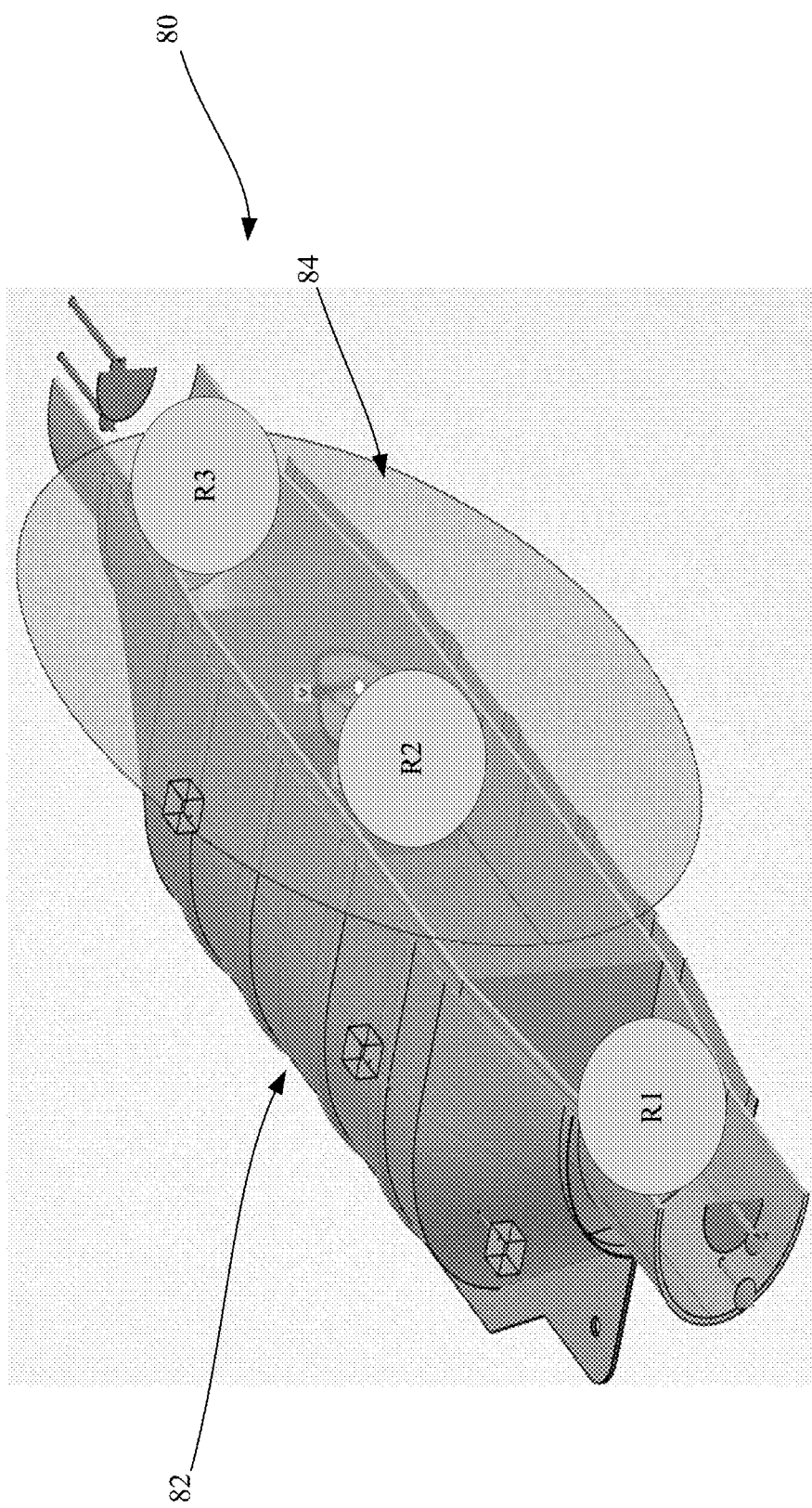
FIGS. 5-8 are diagrams useful in understanding the processes of FIG. 3 and FIG. 4.

The first scenario is when the void space is internal to the CAD geometry (e.g., the void space inside the catalytic converter in which the exhaust gases flow) see FIG. 5. The second scenario is when the flow is external to the CAD parts; the void space will lie external to the CAD parts and is contained in some manner. An example of this would be airflow over car, see FIG. 6.

The third scenario would be a combination of both internal and external flow where the void space would lie internal and external to the CAD parts. In a typical simulation, there are several disconnected regions of void space and require that each be identifiable, see R1, R2, R3 in FIG. 5. For example, in a heat exchanger there are two disconnected regions of void space. The first region is the volume of space occupied by the hot fluid and the second internal void space would be the region occupied by the coolant.

In order to manipulate/restrict or control the void space, the engine uses virtual geometries. The benefit of virtual geometries are several. For example, by using virtual geometries the actual part geometry does not change, thus preserving the validity of all other simulations that refer to a particular CAD. Also, the virtual part production and orienting/manipulating can be performed using two clicks. This reduces the turnaround time in manipulating the void space. The user may have a choice of using various kinds of virtual geometry shapes. Exemplary ones include a bounding box or a bounding plane.

The process automatically detects the void space after having picked just one surface belonging to the void space. The user picks one surface after which the process seeks to automatically determine where the void space lies. This detection methodology takes into account all virtual geometries that exist. Subsequent to processing a mesh is fitted to the part under consideration.

Subsequent to a CAD design process that produces a CAD design, the CAD design program causes the CAD design to be illustrated on a display.

Figure 3:
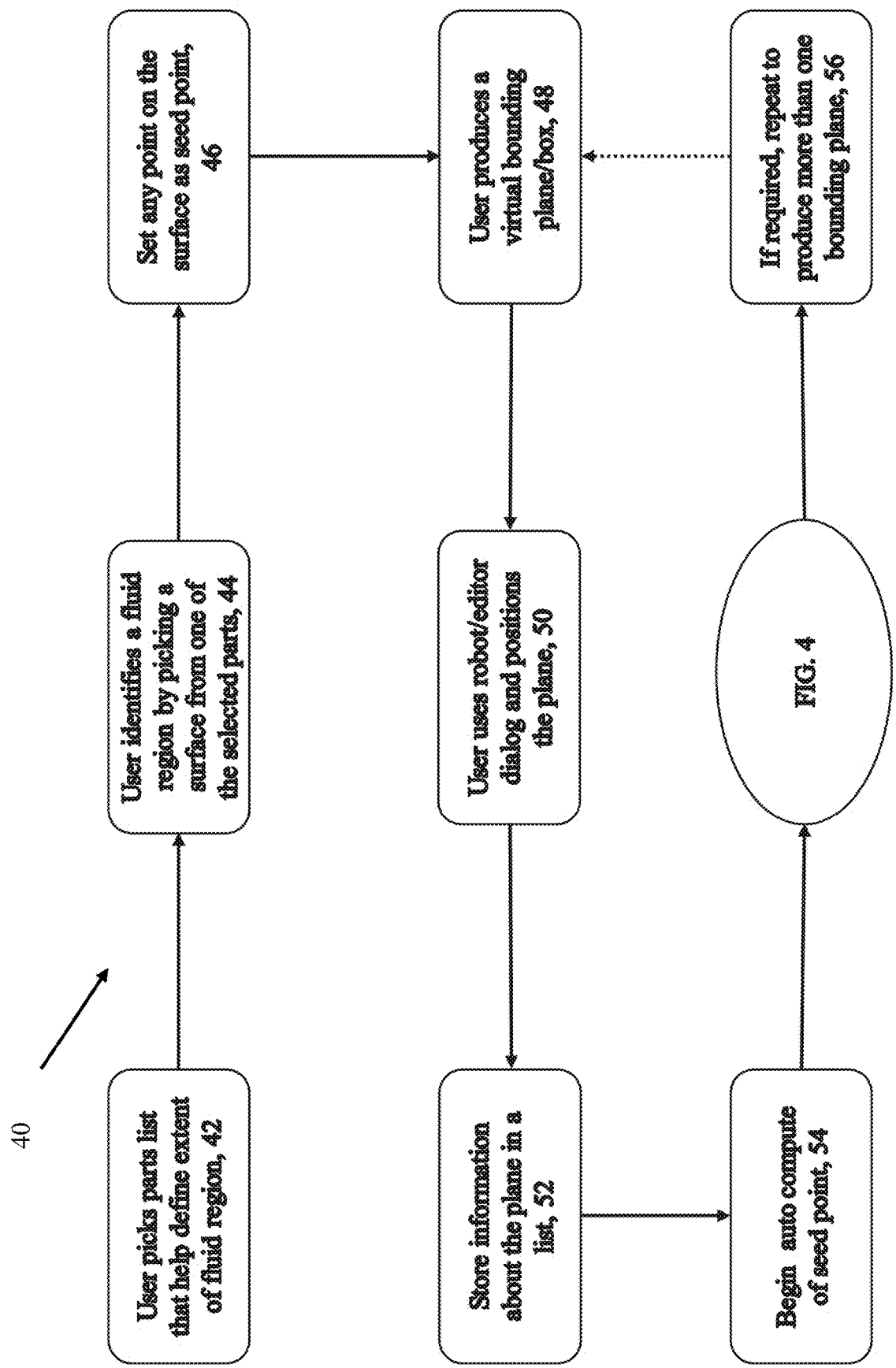
FIG. 3 is a flow diagram that illustrates aspects of processing to determine.

Referring now to FIG. 3, a fluid flow identification process 40 is shown. A user picks 42 a parts list that occupies volume in the fluid region and as a result helps define an extent of a fluid region. The user identifies 44 in the rendered display a fluid region by picking a surface from one of the selected parts. The algorithm selects 46 any point on the surface as an initial seed point. The user selects 48 for the system to produce a virtual shape that will be used to traverse through the displayed fluid region. One example of a virtual shape is a bounding plane. Another example is a bounding box. Other virtual shapes are possible. The user in any event causes the system to produces a virtual shape, e.g., a bounding plane or a bounding box. A bounding plane will be used in the discussion below.

Once the system produces the bounding plane, the user or the system can position the bounding plane at a strategic location, for example, along the axis of symmetry of the CAD part. Once positioned the system stores identifiable information about the virtual geometry. In the case of a virtual bounding plane, the coordinates of a point on the bounding plane and a normal vector to the bounding plane is stored by the system.

Figure 4:
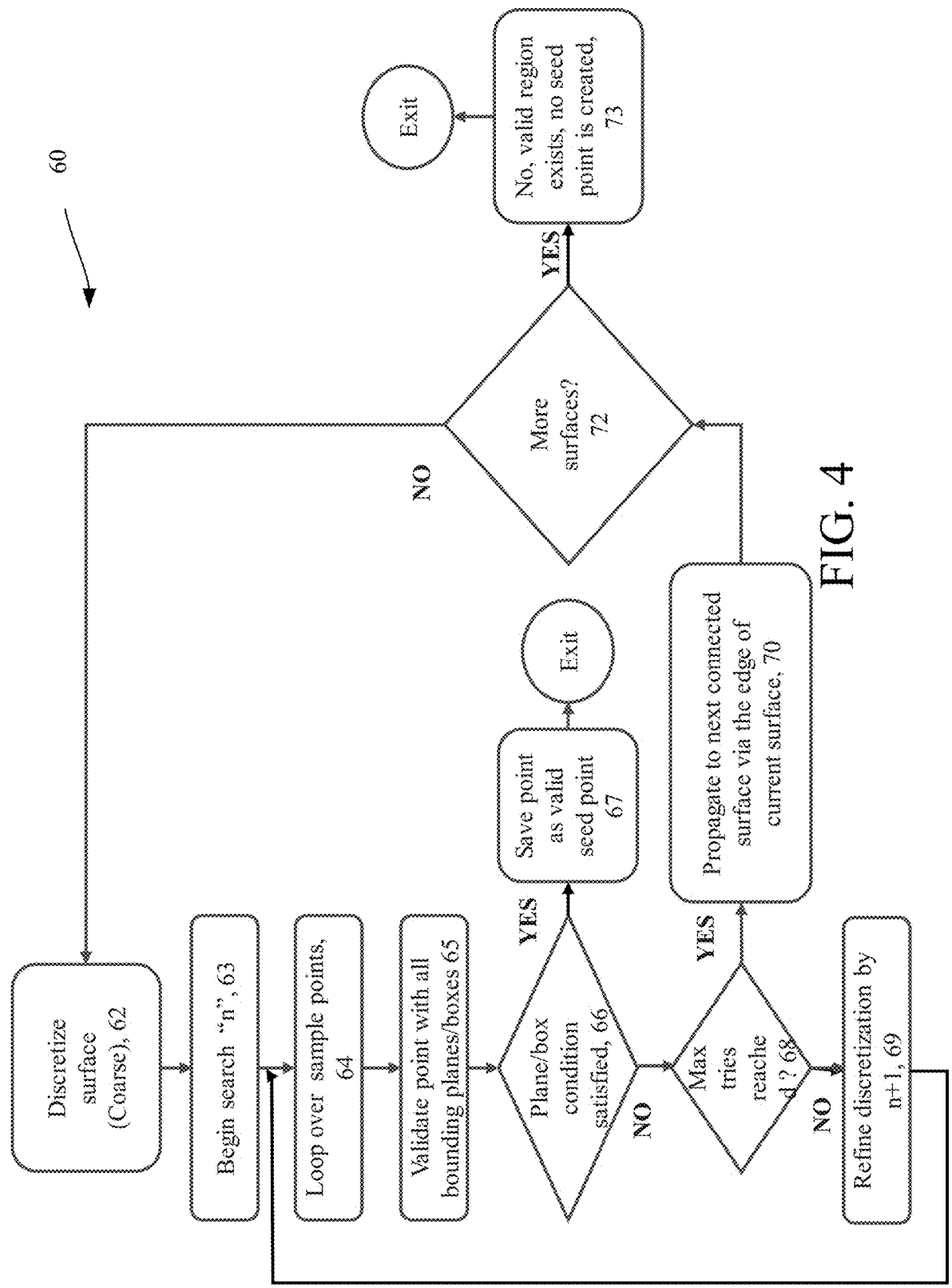
FIG. 4 is a flow diagram that illustration an auto seed process.

The system will begin an auto compute of the seed point 54, by calling the process of FIG. 4. Upon return from the process of FIG. 4, the system either computed a valid internal seed point or displayed a warning that the combination of virtual geometries, participating CAD parts and the initial surface picked by the user does not evaluate to a valid inner point.

The system upon returning from the process of FIG. 4, is in a state that can accept if required by the user additional virtual geometries to refine/define the extent of the fluid region and with it all seed points previously computed are re-evaluated once again automatically.

Referring now to FIG. 4, an auto computation of seed point process 60 is shown. The auto computation of a seed point occurs by the system performing a discretization 62 of the surface under consideration. The auto compute of seed point searches 63 at a discretization of value of "n." The system loops 64 over sample points and validates all points 65 with all virtual bounding planes. If the virtual bounding plane condition 66 is satisfied, the system saves 67 the point as valid seed point and exits.

However, if the virtual bounding plane condition 66 is not satisfied, the system determines 68 whether a preset maximum number of attempts have been reached. If the maximum tries has not been reached, the system propagates back to a subsequent search try for by incrementing 69 the discretization by for example a value of 1. Thus, the next discretization will be for a value of "2n."

On the other hand, if the maximum attempts have been reached the system propagates 70 to the next surface via some chosen algorithm. For example, the process could propagate to the next connected surface via the edge of the current surface or another process could be one where it propagates to the next surface by drawing a normal along the current surface and finding the next surface to intersect the normal. That is, there are several surface propagation algorithms, this can be a choice presented to the user or pre-determined. The disclosed approach does not confine the process to one surface but moves to another surface that effectively replaces the conventional technique of asking the user to pick all the enveloping surfaces. Instead, the process finds these surfaces and we need only one that gives us a "inner" point. The system tests 72 if there are more surfaces, e.g., whether the surface has already been examined or whether all surfaces been visited. If all of the surfaces have not been examined, the system attempts to auto seed the next surface, returning to functional feature 62. On the other hand, if all surfaces have been examined, the system exits 73, as no valid region exists and no seed point is produced.

The user or the system has a set of parameters including a max number of iterations and an initial value of "n." The value of "n" varies according to the CAD design and geometry of the part. For example, a relatively complex geometry may have a lower value of "n" than a simple geometry.

The auto compute process computes valid regions where to mesh, by undertaking a very coarse discretization of the geometry to find a first valid seed point that satisfies all virtual bounding planes, and/or virtual boxes taken together. If solution is not found, the process refines discretization and repeats to a maximum number of attempts. If nothing is found then the setup of planes and boxes results in no solution.

The information regarding the virtual geometry that is stored can be parametrized, such as by a script or another application. Modifying the stored parameters will imply changing the dimensions or reorienting the virtual geometries.

Referring now to FIG. 5, a portion 82 of a catalytic converter 80 is depicted. The catalytic converter 80 has been bifurcated by a bounding plane 84, as shown.

Figure 6:
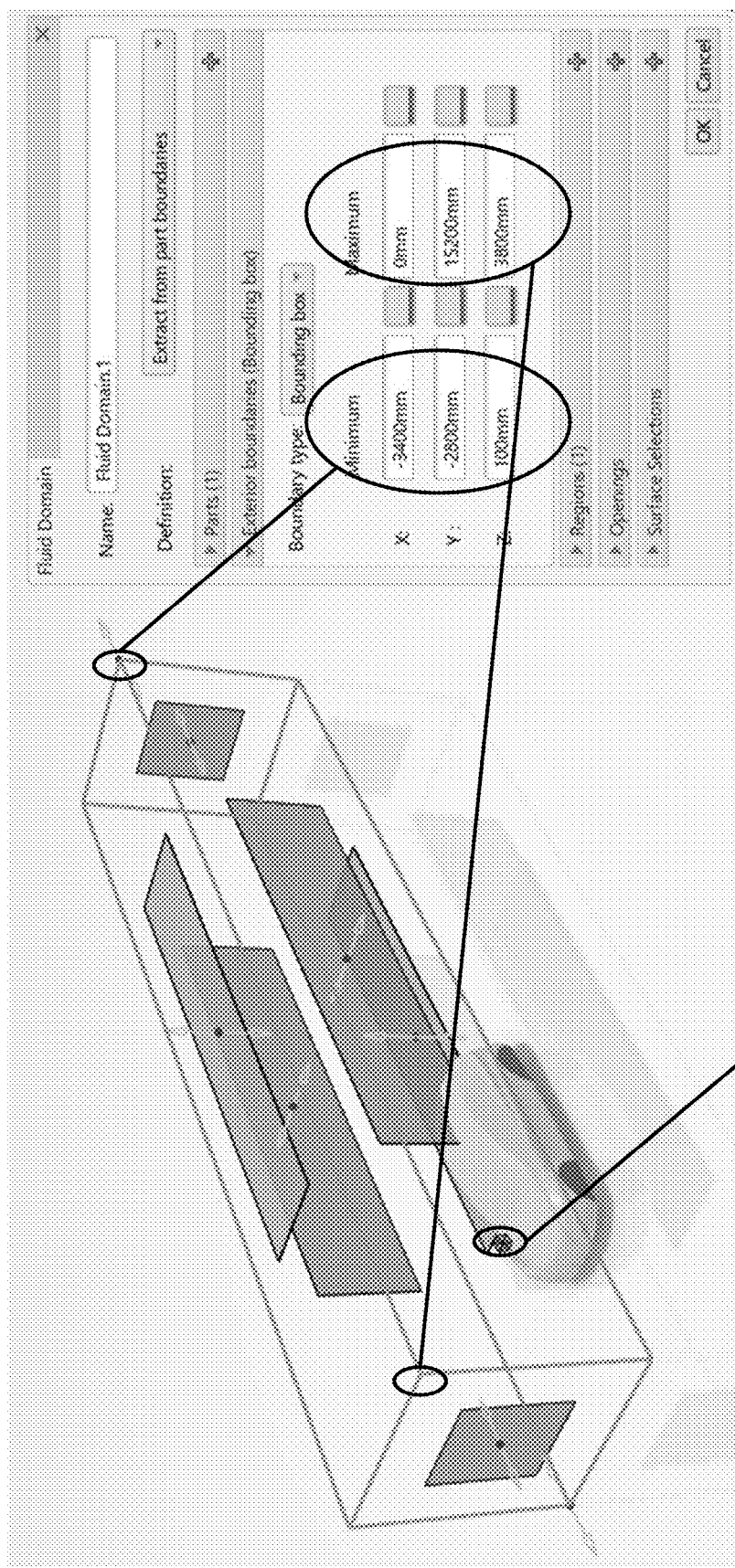
Figure 6A:
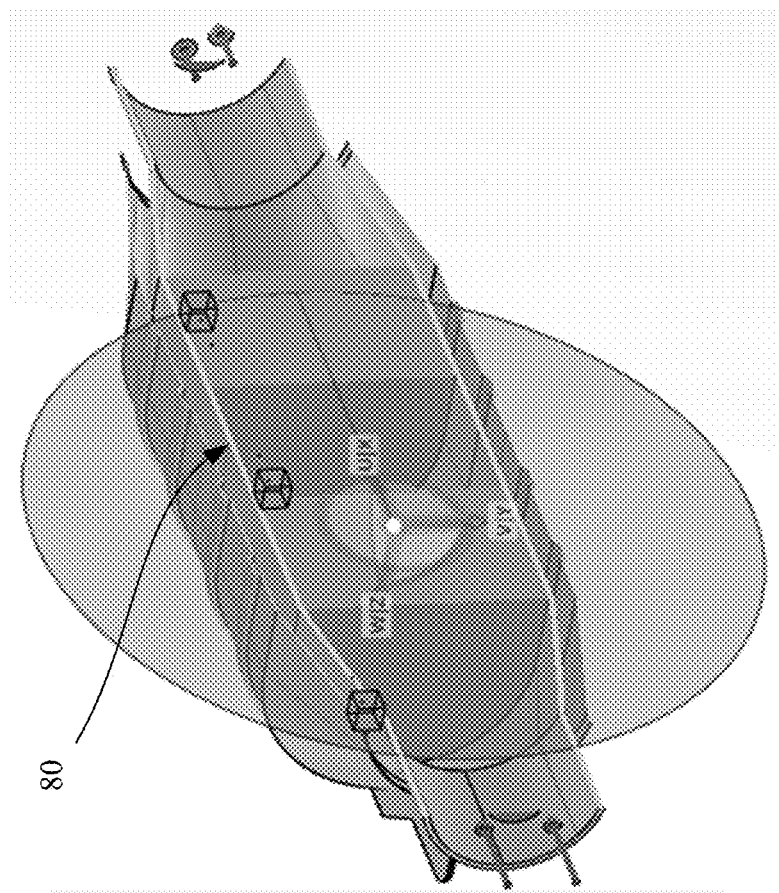
Figure 6A:
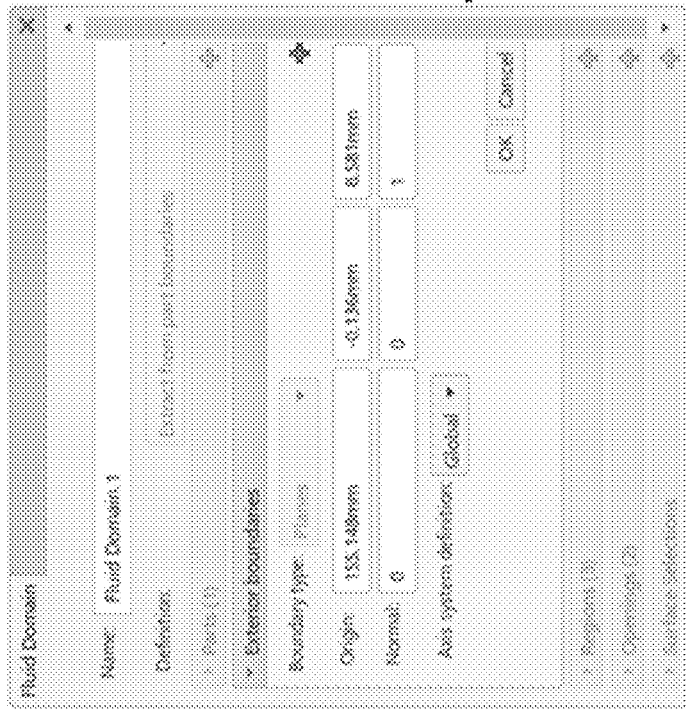

Referring now to FIGS. 6 and 6A, a graphical user interface 86 (FIG. 6A) is shown. In FIG. 6 a user has selected planes as a boundary type. This selection causes a second graphical user interface 88 to appear that has populated. The numbers shown in the second GUI are the "identifiable" information of the virtual bounding plane that the system stores. The identifiable information for the bounding plane is the coordinates of a point on the plane (in global axis system) and a normal vector to the plane (see FIG. 6A).

In the case of the bounding box, the coordinates of the diagonally opposite corners are stored (see FIG. 6). FIG. 6 also shows a valid seed point 86 that was selected by the system.

Also shown in FIG. 6A is the boundary virtual bounding plane that was selected, as applied by the system to the portion 82 of the catalytic converter. FIG. 6A shows the positioning of the bounding plane, and origin and normal information of the bounding plane being stored by the system as an identifiable information about the bounding plane.

Figure 7:
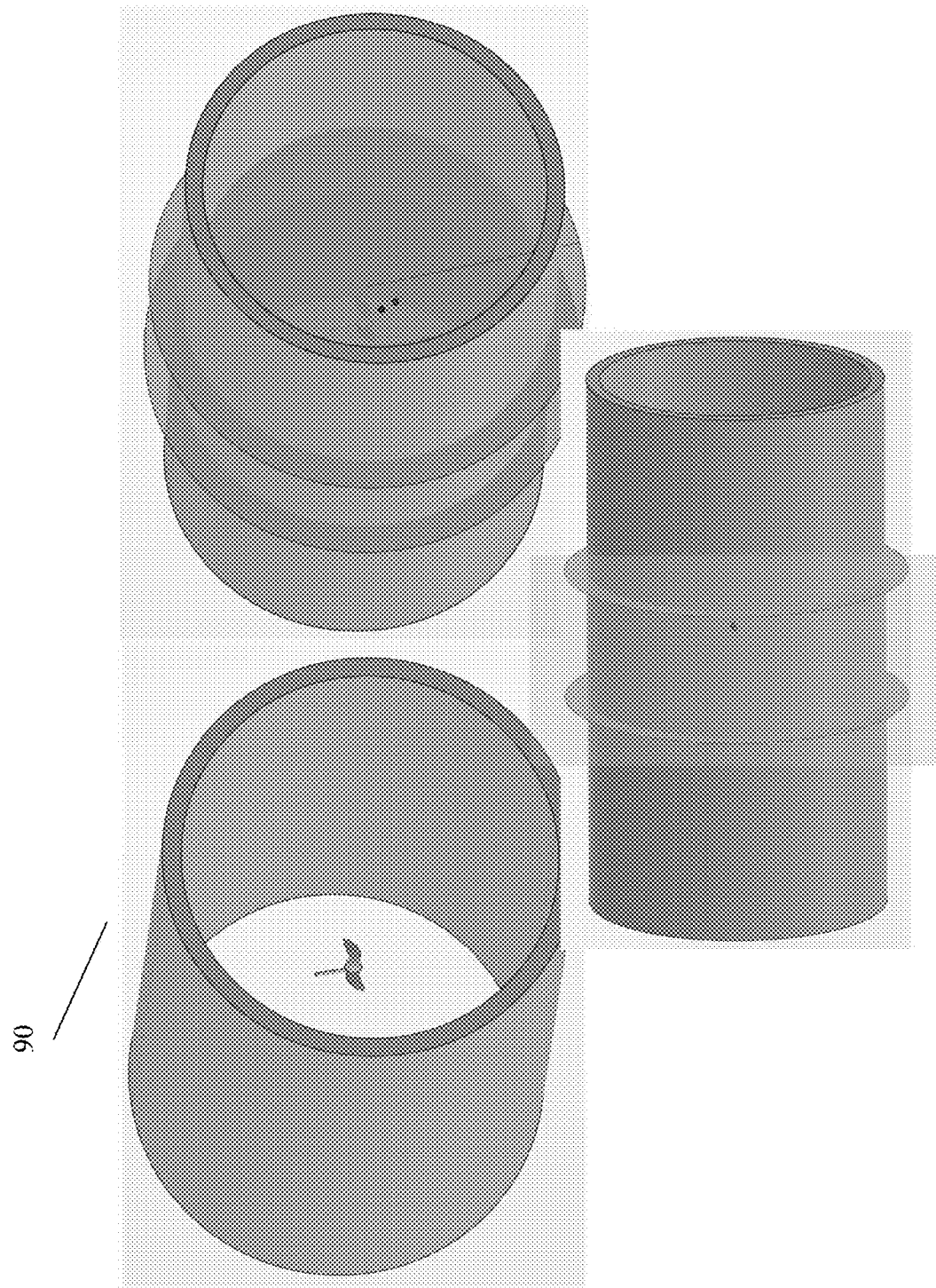

FIG. 7, depicts a use case 90 where the user wishes to use the virtual bounding plane to restrict the fluid domain to a portion of the duct pipe in which the propellers are placed.

Figure 7A:
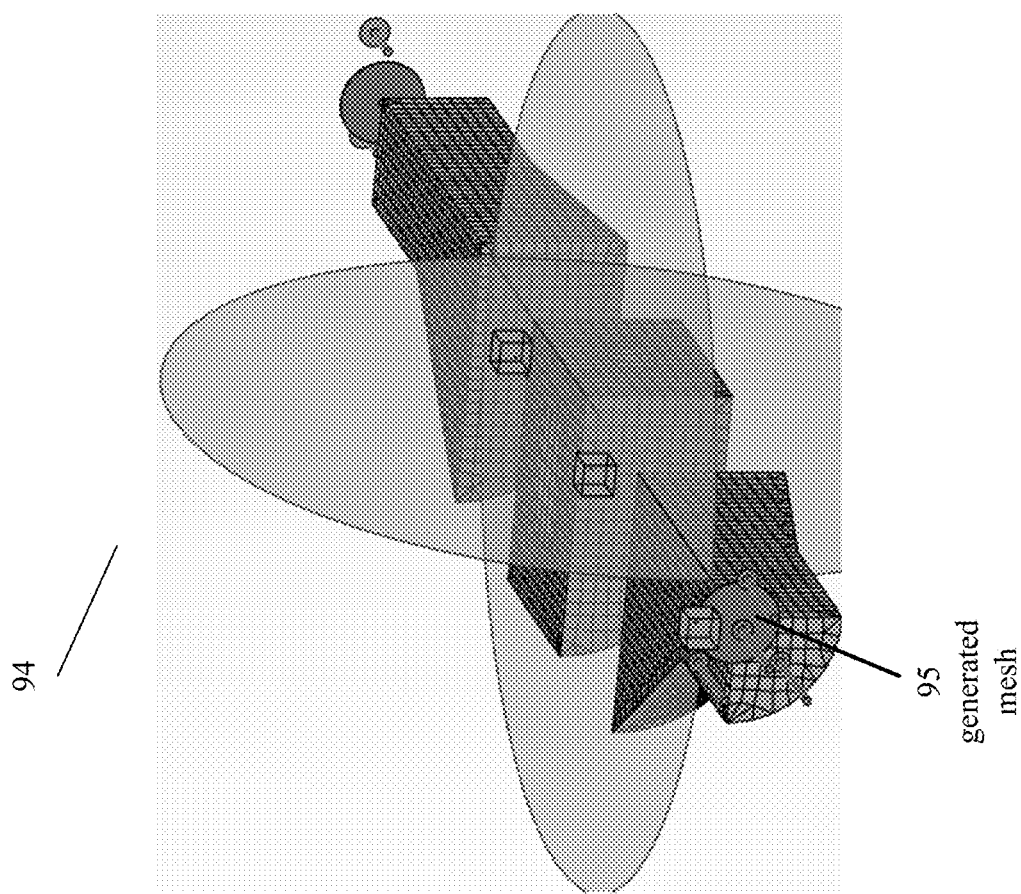
Figure 7A:
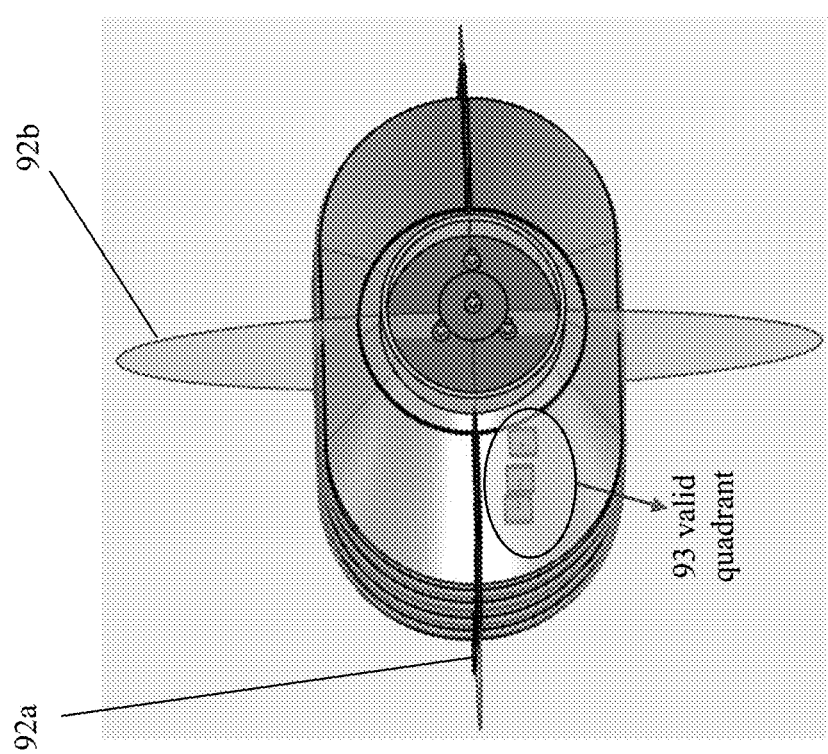

FIG. 7A shows how the auto seed points are evaluated taking into account the list of CAD parts selected along with any virtual geometries defined. In FIG. 7A there are two (2) virtual bounding planes 92a, 92b orthogonal to one another along the axis of symmetry of the catalytic converter. The result of this is that the void space is limited to the bottom left corner of the catalytic converter. The seed point 93 can be seen positioned in that quadrant and the final output is that the void space is correctly meshed (discretized). In FIG. 7A, the catalytic converter 80 is divided along two (2) planes of symmetry using the two (2) bounding planes. Further, the user is allowed to reorient and reposition any of the virtual geometries and the auto seeding is re-evaluated automatically. The resulting body fitted hex-dominant mesh is generated and can be seen to terminate at the virtual geometries.

Figure 8:
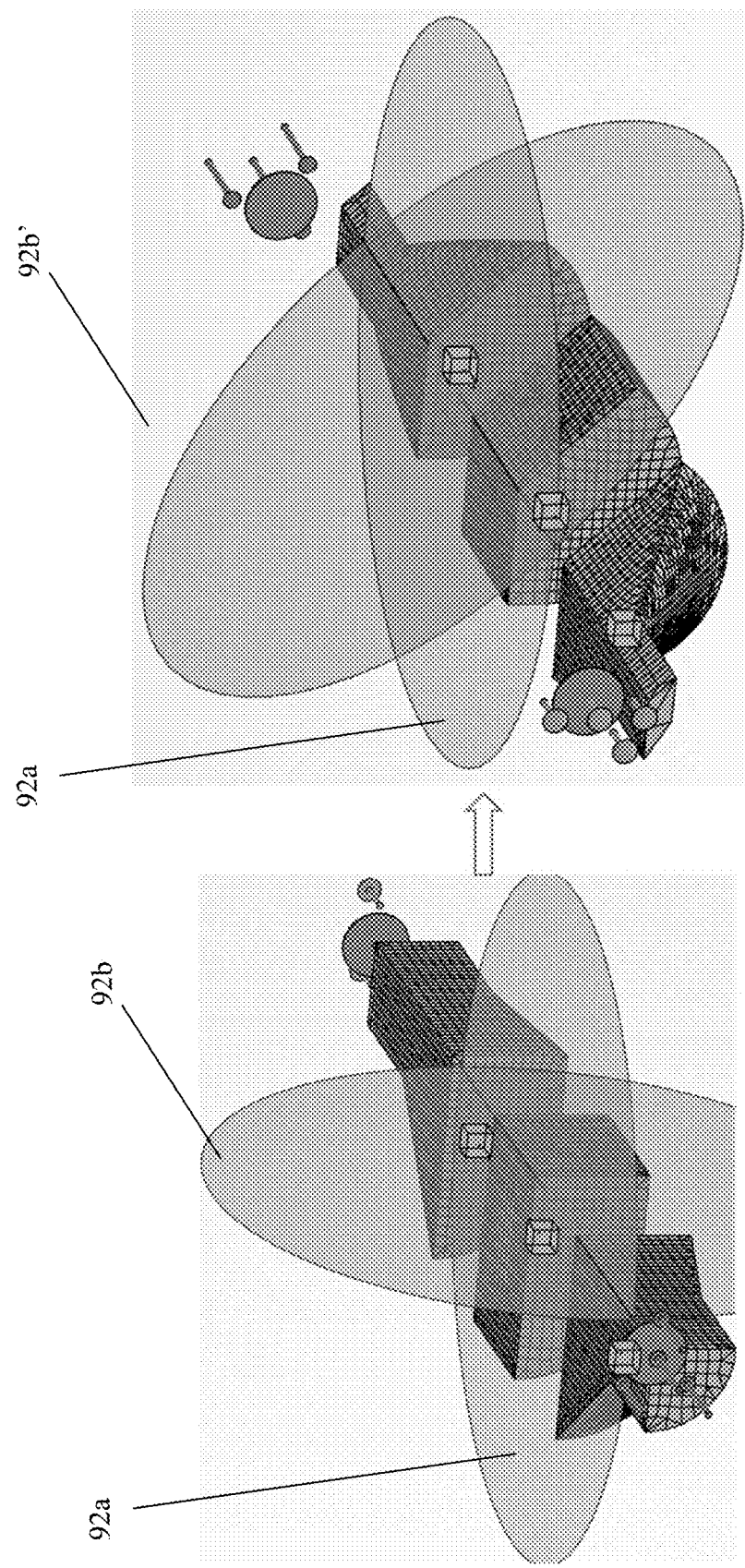

FIG. 8 shows the ease with which one can manipulate the void space. The user re-orients one of the bounding planes 92a, 92b to provide boundary planes 92a and 92b', and the system automatically re-computes the seed points (as described in FIG. 3 and FIG. 4) and produces a desired discretization of the void space.

Having identified the void space, the CAD drawing(s) an appropriate mesh is applied to the CAD drawings and they are used for a fluid flow simulation performed by the simulation engine 34. For example, as described in U.S. patent application Ser. No. 11/463,673, entitled COMPUTER SIMULATION OF PHYSICAL PROCESS (now issued as U.S. Pat. No. 7,558,714) incorporated herein in its entirety by reference.

Alternatively, other fluid flow simulations could be uses such as a computational fluid dynamic (CFD) simulation, e.g., finite volume method of CFD. Any CFD method can be used. In addition, the above techniques can be used to discretize a volume for other purposes.

Figure 12:
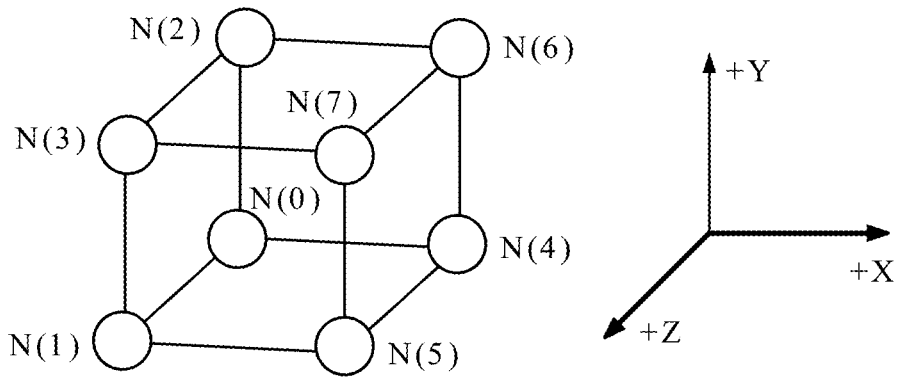
FIG. 12 is a perspective view of a microblock (prior art).
Figure 13A:
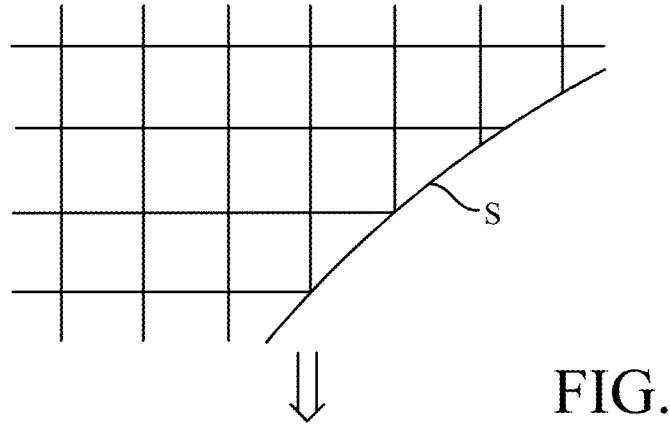
FIGS. 13A-13B are illustrations of lattice structures used by the system of FIG. 1 (prior art).
Figure 13B:
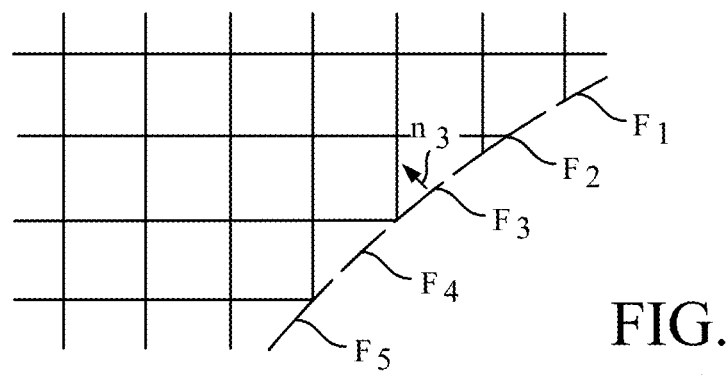
Figure 14:
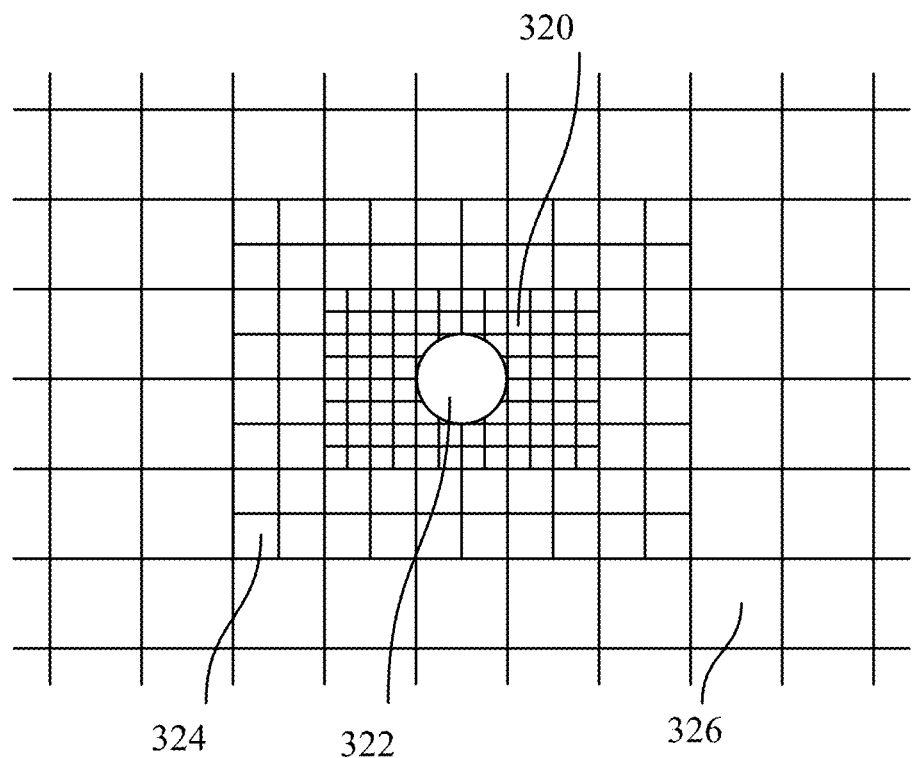
FIGS. 14 and 15 illustrate variable resolution techniques (prior art).
Figure 15:
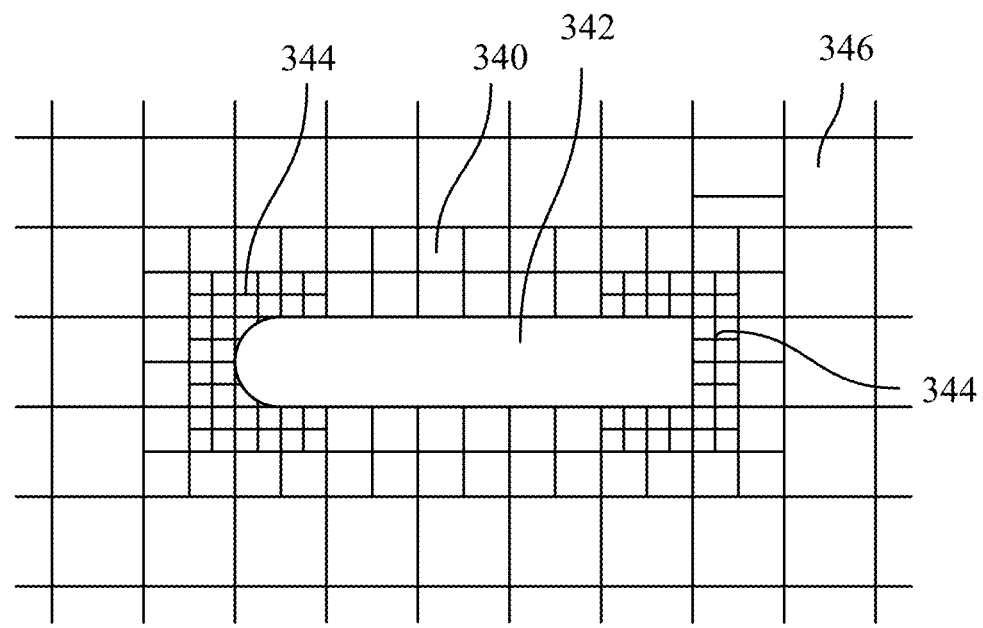
Figure 16:
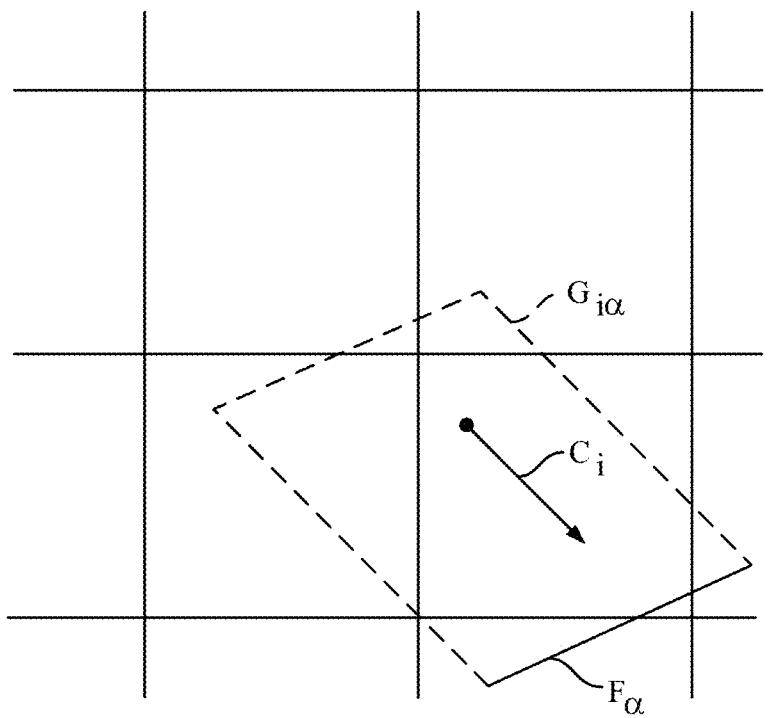
FIG. 16 illustrates movement of particles (prior art).
Figure 17:
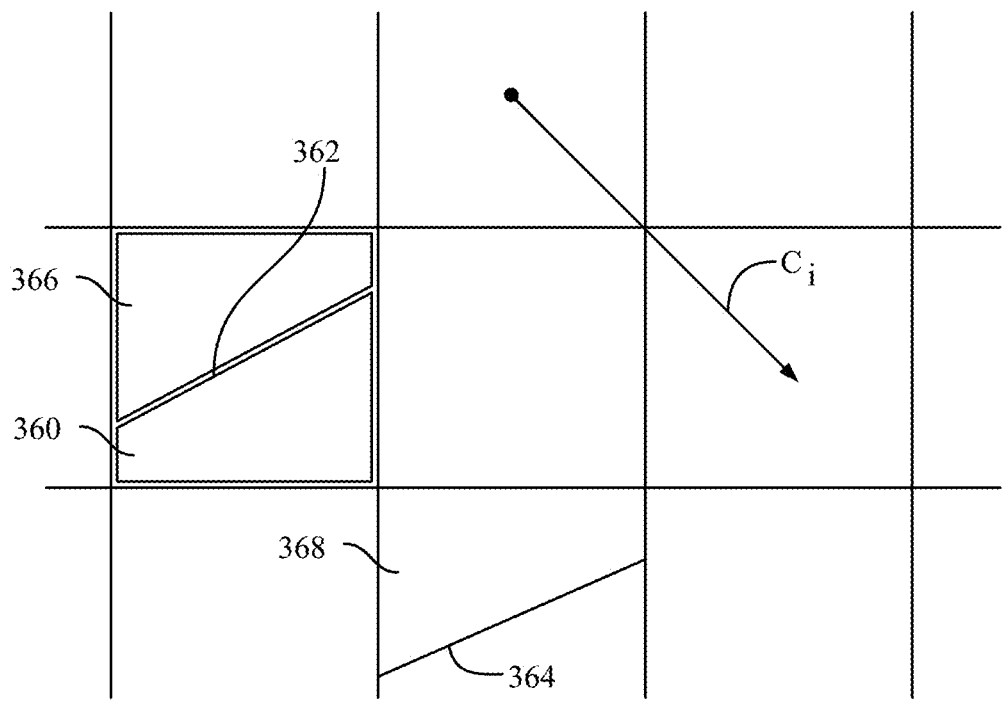
FIG. 17 illustrates regions affected by a facet of a surface (prior art).

In the procedure discussed in FIG. 11 below, a flow simulation process is described using CAD drawings with the identified void space to configure a simulation space. In the figures that follow such as FIG. 12 the perspective view of a microblock, FIGS. 13A-13B illustrations of lattice structures, FIGS. 14 and 15 illustrations of variable resolution techniques, FIG. 16 illustrations of movement of particles, and FIG. 17 illustration of regions affected by a facet of a surface, each of these FIGS. 12-17 are labeled as prior art because these figures appear in the above referenced patent.

However, the figures as they appear in the above Patent do not take into consideration any modifications that would be made to a flow simulation using the identified void space CAD drawings, because the void identification process described herein is not described in the above referenced Patent.

Model Simulation Space

In a LBM-based physical process simulation system, fluid flow is represented by the distribution function values $f_i$, evaluated at a set of discrete velocities $c_i$. The dynamics of the distribution function is governed by Equation I1 where $f_i(0)$ is known as the equilibrium distribution function, defined as:

$$f_\alpha^{(0)} = w_\alpha \rho \left[ 1 + u_\alpha + \frac{u_\alpha^2 - u^2}{2} + \frac{u_\alpha(u_\alpha^2 - 3u^2)}{6} \right] \qquad \text{Eq. (I1)}$$

where $u_\alpha = c_i \cdot \frac{u}{T}$

This equation is the well-known lattice Boltzmann equation that describes the time-evolution of the distribution function, $f_i$. The left-hand side represents the change of the distribution due to the so-called "streaming process." The streaming process is when a pocket of fluid starts out at a mesh location, and then moves along one of plural velocity vectors to the next mesh location. At that point, the "collision factor," i.e., the effect of nearby pockets of fluid on the starting pocket of fluid, is calculated. The fluid can only move to another mesh location, so the proper choice of the velocity vectors is necessary so that all the components of all velocities are multiples of a common speed.

The right-hand side of the first equation is the aforementioned "collision operator" which represents the change of the distribution function due to the collisions among the pockets of fluids. The particular form of the collision operator is of the Bhatnagar, Gross and Krook (BGK) operator. The collision operator forces the distribution function to go to the prescribed values given by the second equation, which is the "equilibrium" form.

The BGK operator is constructed according to the physical argument that, no matter what the details of the collisions, the distribution function approaches a well-defined local equilibrium given by $\{f^{eq}(x,v,t)\}$ via collisions:

$$C = -\frac{1}{\tau}(f - f^{eq}), \qquad \text{Eq. (I2)}$$

where the parameter $\tau$ represents a characteristic relaxation time to equilibrium via collisions. Dealing with particles (e.g., atoms or molecules) the relaxation time is typically taken as a constant.

From this simulation, conventional fluid variables, such as mass $\rho$ and fluid velocity u, are obtained as simple summations in Equation (I3).

$$\rho(x, t) = \sum_i f_i(x, t); \rho u(x, t) = \sum_i c_i f_i(x, t); \qquad \text{Eq. (I3)}$$

$$DT(x, t) = \sum_i (c_i - u)^2 f_i(x, t)$$

where $\rho$, u, and T are, respectively, the fluid density, velocity and temperature, and D is the dimension of the discretized velocity space (not necessarily equal to the physical space dimension).

Due to symmetry considerations, the set of velocity values are selected in such a way that they form certain lattice structures when spanned in the configuration space. The dynamics of such discrete systems obeys the LBE having the form $$f_i(x+c_i, t+1)-f_i(x, t)=C_i(x, t)$$

where the collision operator usually takes the BGK form as described above. By proper choice of the equilibrium distribution forms, it can be theoretically shown that the lattice Boltzmann equation gives rise to correct hydrodynamics and thermo-hydrodynamics. That is, the hydrodynamic moments derived from $f_i(x,t)$ obey the Navier-Stokes equations in the macroscopic limit. These moments are defined by Equation (I3) above.

The collective values of $c_i$ and $w_i$ define a LBM model. The LBM model can be implemented efficiently on scalable computer platforms and run with great robustness for time unsteady flows and complex boundary conditions.

A standard technique of obtaining the macroscopic equation of motion for a fluid system from the Boltzmann equation is the Chapman-Enskog method in which successive approximations of the full Boltzmann equation are taken. In a fluid system, a small disturbance of the density travels at the speed of sound. In a gas system, the speed of sound is generally determined by the temperature. The importance of the effect of compressibility in a flow is measured by the ratio of the characteristic velocity and the sound speed, which is known as the Mach number.

A general discussion of a LBM-based simulation system is provided below that may be used in conjunction with the above gap filled CAD process to conduct fluid flow simulations. For a further explanation of LBM-based physical process simulation systems the reader is referred to the above incorporated by reference US patent.

Figure 9:
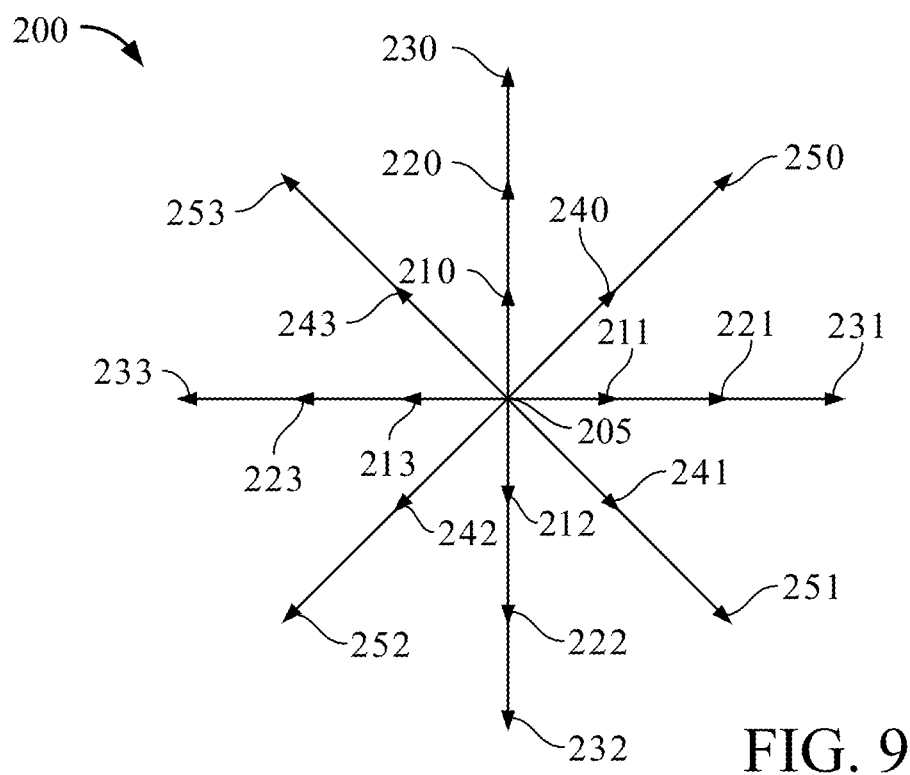
FIGS. 9 and 10 illustrate velocity components of two LBM models represented in Euclidian space (prior art).

Referring to FIG. 9, a first model (2D-1) 200 is a two-dimensional model that includes 21 velocities. Of these 21 velocities, one (205) represents particles that are not moving; three sets of four velocities represent particles that are moving at either a normalized speed (r) (210-213), twice the normalized speed (2r) (220-223), or three times the normalized speed (3r) (230-233) in either the positive or negative direction along either the x or y axis of the lattice; and two sets of four velocities represent particles that are moving at the normalized speed (r) (240-243) or twice the normalized speed (2r) (250-253) relative to both of the x and y lattice axes.

Figure 10:
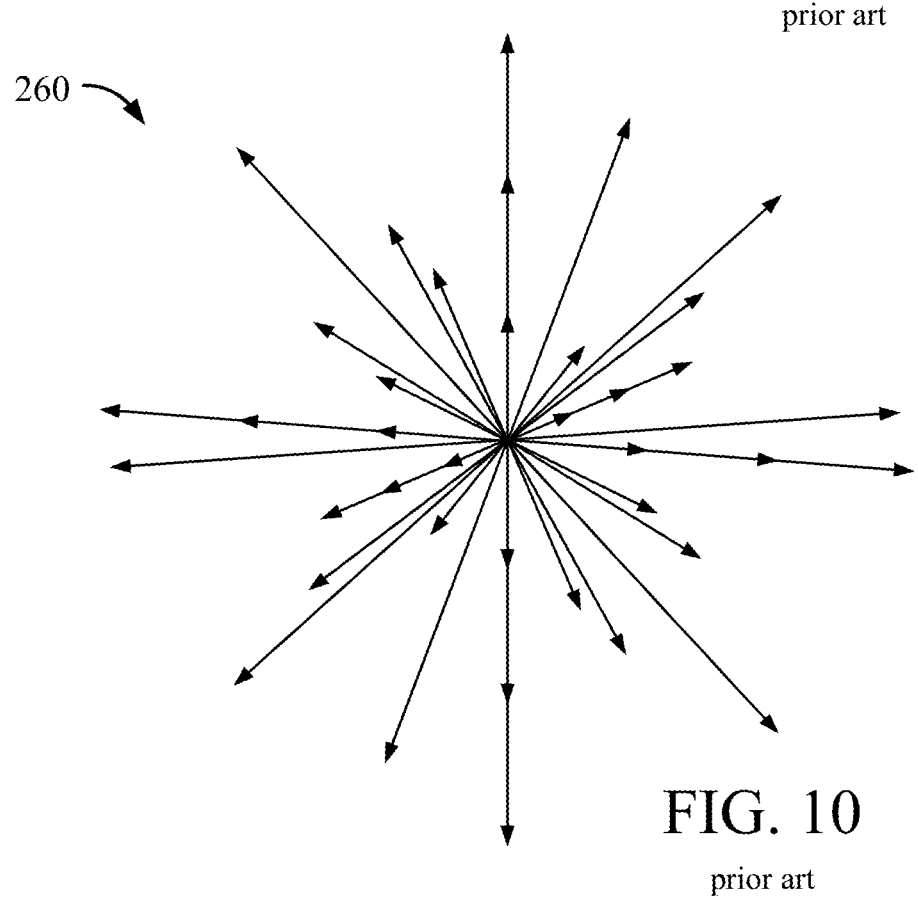

Referring to FIG. 10, illustrated is a second model (3D-1) 260—a three-dimensional model that includes 39 velocities where each velocity is represented by one of the arrowheads of FIG. 10. Of these 39 velocities, one represents particles that are not moving; three sets of six velocities represent particles that are moving at either a normalized speed (r), twice the normalized speed (2r), or three times the normalized speed (3r) in either the positive or negative direction along the x, y or z axis of the lattice; eight represent particles that are moving at the normalized speed (r) relative to all three of the x, y, z lattice axes; and twelve represent particles that are moving at twice the normalized speed (2r) relative to two of the x, y, z lattice axes.

More complex models, such as a 3D-2 model includes 101 velocities and a 2D-2 model includes 37 velocities also may be used. For the three-dimensional model 3D-2, of the 101 velocities, one represents particles that are not moving (Group 1); three sets of six velocities represent particles that are moving at either a normalized speed (r), twice the normalized speed (2r), or three times the normalized speed (3r) in either the positive or negative direction along the x, y or z axis of the lattice (Groups 2, 4, and 7); three sets of eight represent particles that are moving at the normalized speed (r), twice the normalized speed (2r), or three times the normalized speed (3r) relative to all three of the x, y, z lattice axes (Groups 3, 8, and 10); twelve represent particles that are moving at twice the normalized speed (2r) relative to two of the x, y, z lattice axes (Group 6); twenty four represent particles that are moving at the normalized speed (r) and twice the normalized speed (2r) relative to two of the x, y, z lattice axes, and not moving relative to the remaining axis (Group 5); and twenty four represent particles that are moving at the normalized speed (r) relative to two of the x, y, z lattice axes and three times the normalized speed (3r) relative to the remaining axis (Group 9).

For the two-dimensional model 2D-2, of the 37 velocities, one represents particles that are not moving (Group 1); three sets of four velocities represent particles that are moving at either a normalized speed (r), twice the normalized speed (2r), or three times the normalized speed (3r) in either the positive or negative direction along either the x or y axis of the lattice (Groups 2, 4, and 7); two sets of four velocities represent particles that are moving at the normalized speed (r) or twice the normalized speed (2r) relative to both of the x and y lattice axes; eight velocities represent particles that are moving at the normalized speed (r) relative to one of the x and y lattice axes and twice the normalized speed (2r) relative to the other axis; and eight velocities represent particles that are moving at the normalized speed (r) relative to one of the x and y lattice axes and three times the normalized speed (3r) relative to the other axis.

The LBM models described above provide a specific class of efficient and robust discrete velocity kinetic models for numerical simulations of flows in both two-and three-dimensions. A model of this kind includes a particular set of discrete velocities and weights associated with those velocities. The velocities coincide with grid points of Cartesian coordinates in velocity space which facilitates accurate and efficient implementation of discrete velocity models, particularly the kind known as the lattice Boltzmann models. Using such models, flows can be simulated with high fidelity.

Figure 11:
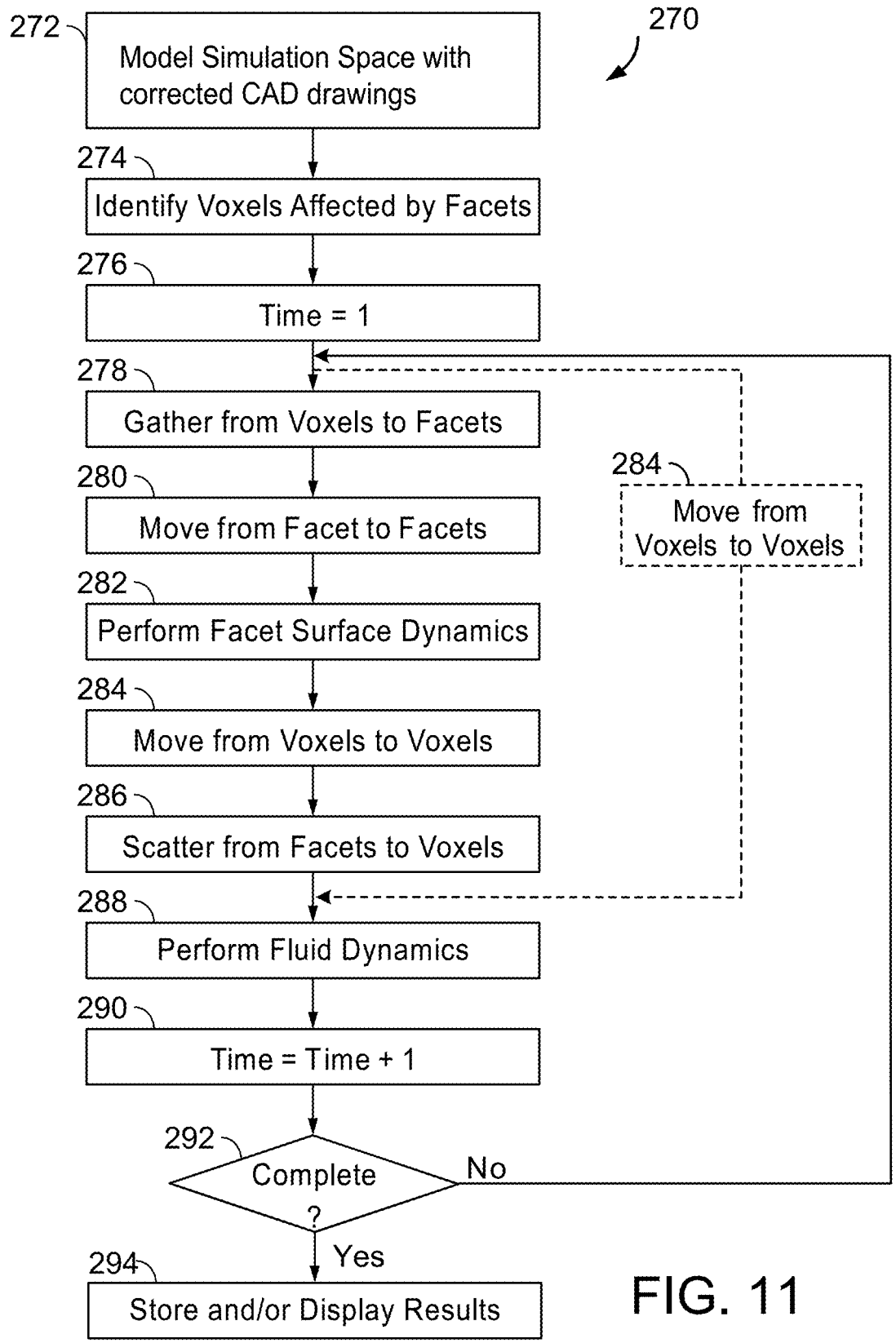
FIG. 11 is a flow chart of a procedure followed by a physical process simulation system using corrected CAD drawings.

Referring to FIG. 11, a physical process simulation system operates according to a procedure 270 to simulate a physical process such as fluid flow is described. Prior to the flow simulation, a simulation space is modeled (step 272) using the corrected CAD drawings discussed above, as a collection of voxels. The simulation space is generated using a computer-aided-design (CAD) program and the gap correction processing of the CAD generated drawings. For example, a CAD program could be used to draw an micro-device positioned in a wind tunnel and the gap correction process can identify gaps of significance and fill in those gaps, without significant user intervention (other than setting threshold values for $d^{th}$ and $\alpha^{th}$. Thereafter, this corrected data produced by the CAD program is processed to add a lattice structure having appropriate resolution and to account for objects and surfaces within the simulation space.

The resolution of the lattice may be selected based on the Reynolds number of the system being simulated. The Reynolds number is related to the viscosity (v) of the flow, the characteristic length (L) of an object in the flow, and the characteristic velocity (u) of the flow:

$$Re=uL/v \qquad \text{Eq. (14)}$$

The characteristic length of an object represents large scale features of the object. For example, if flow around a micro-device were being simulated, the height of the micro-device might be considered to be the characteristic length. When flow around small regions of an object (e.g., the side mirror of an automobile) is of interest, the resolution of the simulation may be increased, or areas of increased resolution may be employed around the regions of interest. The dimensions of the voxels decrease as the resolution of the lattice increases.

The state space is represented as $f_i(x, t)$, where $f_i$ represents the number of elements, or particles, per unit volume in state i (i.e., the density of particles in state i) at a lattice site denoted by the three-dimensional vector x at a time t. For a known time increment, the number of particles is referred to simply as $f_i(x)$. The combination of all states of a lattice site is denoted as $f(x)$.

The number of states is determined by the number of possible velocity vectors within each energy level. The velocity vectors consist of integer linear speeds in a space having three dimensions: x, y, and z. The number of states is increased for multiple-species simulations.

Each state i represents a different velocity vector at a specific energy level (i.e., energy level zero, one or two).

The velocity $c_i$ of each state is indicated with its "speed" in each of the three dimensions as follows:

$$c_i = (c_{ix}, c_{iy}, c_{iz}).\qquad\text{Eq. (I5)}$$

The energy level zero state represents stopped particles that are not moving in any dimension, i.e. $c_{stopped} = (0, 0, 0)$. Energy level one states represents particles having a ±1 speed in one of the three dimensions and a zero speed in the other two dimensions. Energy level two states represent particles having either a ±1 speed in all three dimensions, or a ±2 speed in one of the three dimensions and a zero speed in the other two dimensions.

Generating all of the possible permutations of the three energy levels gives a total of 39 possible states (one energy zero state, 6 energy one states, 8 energy three states, 6 energy four states, 12 energy eight states and 6 energy nine states.).

Each voxel (i.e., each lattice site) is represented by a state vector f(x). The state vector completely defines the status of the voxel and includes 39 entries. The 39 entries correspond to the one energy zero state, 6 energy one states, 8 energy three states, 6 energy four states, 12 energy eight states and 6 energy nine states. By using this velocity set, the system can produce Maxwell-Boltzmann statistics for an achieved equilibrium state vector.

For processing efficiency, the voxels are grouped in 2×2×2 volumes called microblocks. The microblocks are organized to permit parallel processing of the voxels and to minimize the overhead associated with the data structure. A short-hand notation for the voxels in the microblock is defined as $N_i(n)$, where n represents the relative position of the lattice site within the microblock and $n \in \{0,1,2, \ldots, 7\}$. A microblock is illustrated in FIG. 12.

Referring to FIGS. 13A and 13B, a surface S (FIG. 13A) is represented in the simulation space (FIG. 13B) as a collection of facets $F_\alpha$:

$$S = \{F_\alpha\}\qquad\text{Eq. (I6)}$$

where α is an index that enumerates a particular facet. A facet is not restricted to the voxel boundaries, but is typically sized on the order of or slightly smaller than the size of the voxels adjacent to the facet so that the facet affects a relatively small number of voxels. Properties are assigned to the facets for the purpose of implementing surface dynamics. In particular, each facet $F_\alpha$ has a unit normal ($n_\alpha$), a surface area ($A_\alpha$), a center location ($x_\alpha$), and a facet distribution function ($f_i(\alpha)$) that describes the surface dynamic properties of the facet. The total energy distribution function $q_i(\alpha)$ is treated in the same way as the flow distribution for facet and voxel interaction.

Referring to FIG. 14, different levels of resolution may be used in different regions of the simulation space to improve processing efficiency. Typically, the region 320 around an object 322 is of the most interest and is therefore simulated with the highest resolution. Because the effect of viscosity decreases with distance from the object, decreasing levels of resolution (i.e., expanded voxel volumes) are employed to simulate regions 324, 326 that are spaced at increasing distances from the object 322.

Similarly, as illustrated in FIG. 15, a lower level of resolution may be used to simulate a region 340 around less significant features of an object 342 while the highest level of resolution is used to simulate regions 344 around the most significant features (e.g., the leading and trailing surfaces) of the object 342. Outlying regions 346 are simulated using the lowest level of resolution and the largest voxels.

C. Identify Voxels Affected by Facets

Referring again to FIG. 11, once the simulation space has been modeled (step 272), voxels affected by one or more facets are identified (step 274). Voxels may be affected by facets in a number of ways. First, a voxel that is intersected by one or more facets is affected in that the voxel has a reduced volume relative to non-intersected voxels. This occurs because a facet, and material underlying the surface represented by the facet, occupies a portion of the voxel. A fractional factor $P_f(x)$ indicates the portion of the voxel that is unaffected by the facet (i.e., the portion that can be occupied by a fluid or other materials for which flow is being simulated). For non-intersected voxels, $P_f(x)$ equals one.

Voxels that interact with one or more facets by transferring particles to the facet or receiving particles from the facet are also identified as voxels affected by the facets. All voxels that are intersected by a facet will include at least one state that receives particles from the facet and at least one state that transfers particles to the facet. In most cases, additional voxels also will include such states.

Referring to FIG. 16, for each state i having a non-zero velocity vector $c_i$, a facet $F_\alpha$ receives particles from, or transfers particles to, a region defined by a parallelepiped $G_{i\alpha}$ having a height defined by the magnitude of the vector dot product of the velocity vector $c_i$ and the unit normal $n_\alpha$ of the facet ($|c_i n_i|$) and a base defined by the surface area $A_\alpha$ of the facet so that the volume $V_{i\alpha}$ of the parallelepiped $G_{i\alpha}$ equals:

$$V_{i\alpha} = |c_i n_\alpha| A_\alpha\qquad\text{Eq. (I7)}$$

The facet $F_\alpha$ receives particles from the volume $V_{i\alpha}$ when the velocity vector of the state is directed toward the facet ($|c_i n_i| < 0$), and transfers particles to the region when the velocity vector of the state is directed away from the facet ($|c_i n_i| > 0$). As will be discussed below, this expression must be modified when another facet occupies a portion of the parallelepiped $G_{i\alpha}$, a condition that could occur in the vicinity of non-convex features such as interior corners.

The parallelepiped $G_{i\alpha}$ of a facet $F_\alpha$ may overlap portions or all of multiple voxels. The number of voxels or portions thereof is dependent on the size of the facet relative to the size of the voxels, the energy of the state, and the orientation of the facet relative to the lattice structure. The number of affected voxels increases with the size of the facet. Accordingly, the size of the facet, as noted above, is typically selected to be on the order of or smaller than the size of the voxels located near the facet.

The portion of a voxel N(x) overlapped by a parallelepiped $G_{i\alpha}$ is defined as $V_{i\alpha}(x)$. Using this term, the flux $\Gamma_{i\alpha}(x)$ of state i particles that move between a voxel N(x) and a facet $F_\alpha$ equals the density of state i particles in the voxel ($N_i(x)$) multiplied by the volume of the region of overlap with the voxel ($V_{i\alpha}(x)$):

$$\Gamma_{i\alpha}(x) = N_i(x) + V_{i\alpha}(x).\qquad\text{Eq. (I8)}$$

When the parallelepiped $G_{i\alpha}$ is intersected by one or more facets, the following condition is true:

$$V_{i\alpha} = \Sigma V_{i\alpha}(x) + \Sigma V_{i\alpha}(\beta)\qquad\text{Eq. (I9)}$$

where the first summation accounts for all voxels overlapped by $G_{i\alpha}$ and the second term accounts for all facets that intersect $G_{i\alpha}$. When the parallelepiped $G_{i\alpha}$ is not intersected by another facet, this expression reduces to:

$$V_{i\alpha} = \Sigma V_{i\alpha}(x).\qquad\text{Eq. (I10)}$$

D. Perform Simulation

Once the voxels that are affected by one or more facets are identified (step 274), a timer is initialized to begin the simulation (step 276). During each time increment of the simulation, movement of particles from voxel to voxel is simulated by an advection stage (steps 278-286) that accounts for interactions of the particles with surface facets. Next, a collision stage (step 288) simulates the interaction of particles within each voxel. Thereafter, the timer is incremented (step 200). If the incremented timer does not indicate that the simulation is complete (step 202), the advection and collision stages (steps 278-200) are repeated. If the incremented timer indicates that the simulation is complete (step 202), results of the simulation are stored and/or displayed (step 204).

1. Boundary Conditions for Surface

To correctly simulate interactions with a surface, each facet must meet four boundary conditions. First, the combined mass of particles received by a facet must equal the combined mass of particles transferred by the facet (i.e., the net mass flux to the facet must equal zero). Second, the combined energy of particles received by a facet must equal the combined energy of particles transferred by the facet (i.e., the net energy flux to the facet must equal zero). These two conditions may be satisfied by requiring the net mass flux at each energy level (i.e., energy levels one and two) to equal zero.

The other two boundary conditions are related to the net momentum of particles interacting with a facet. For a surface with no skin friction, referred to herein as a slip surface, the net tangential momentum flux must equal zero and the net normal momentum flux must equal the local pressure at the facet. Thus, the components of the combined received and transferred momentums that are perpendicular to the normal $n_\alpha$ of the facet (i.e., the tangential components) must be equal, while the difference between the components of the combined received and transferred momentums that are parallel to the normal $n_\alpha$ of the facet (i.e., the normal components) must equal the local pressure at the facet. For non-slip surfaces, friction of the surface reduces the combined tangential momentum of particles transferred by the facet relative to the combined tangential momentum of particles received by the facet by a factor that is related to the amount of friction.

2. Gather from Voxels to Facets

As a first step in simulating interaction between particles and a surface, particles are gathered from the voxels and provided to the facets (step 278). As noted above, the flux of state i particles between a voxel $N(x)$ and a facet $F_\alpha$ is:

$$\Gamma_{i\alpha}(x) = N_i(x) V_{i\alpha}(x). \qquad \text{Eq. (I11)}$$

From this, for each state i directed toward a facet $F_\alpha$ ($c_i n_\alpha < 0$), the number of particles provided to the facet $F_\alpha$ by the voxels is:

$$\Gamma_{i\alpha V \to F} = \Sigma_x \Gamma_{i\alpha}(x) = \Sigma_x N_i(x) V_{i\alpha}(x) \qquad \text{Eq. (I12)}$$

Only voxels for which $V_{i\alpha}(x)$ has a non-zero value must be summed. As noted above, the size of the facets is selected so that $V_{i\alpha}(x)$ has a non-zero value for only a small number of voxels. Because $V_{i\alpha}(x)$ and $P_f(X)$ may have non-integer values, $\Gamma_\alpha(x)$ is stored and processed as a real number.

3. Move from Facet to Facet

Figure 19:
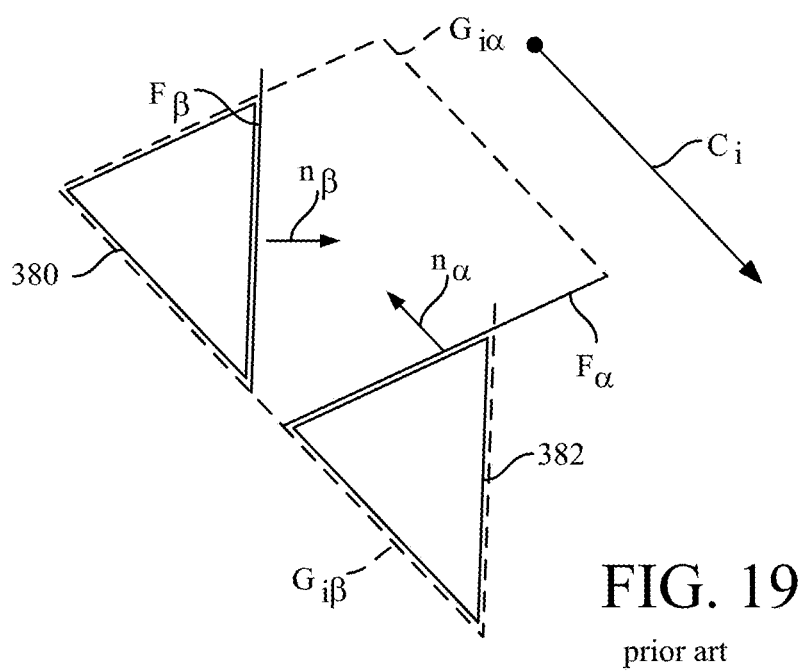
FIG. 19 is a flow chart of a procedure for performing surface dynamics (prior art).
Figure 18:
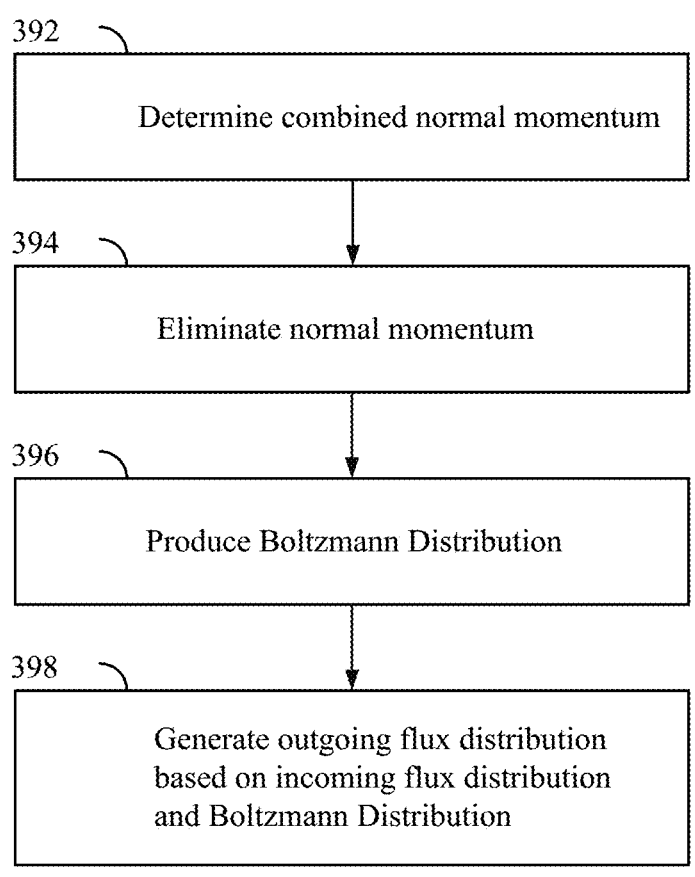
FIG. 18 illustrates a flow chart for surface dynamics (prior art).

Next, particles are moved between facets (step 280). If the parallelepiped $G_{i\alpha}$ for an incoming state ($c_i n_\alpha < 0$) of a facet $F_\alpha$ is intersected by another facet $F_\beta$, then a portion of the state i particles received by the facet $F_\alpha$ will come from the facet $F_\beta$. In particular, facet $F_\alpha$ will receive a portion of the state i particles produced by facet $F_\beta$ during the previous time increment. This relationship is illustrated in FIG. 19, where a portion 380 of the parallelepiped $G_{i\alpha}$ that is intersected by facet $F_\beta$ equals a portion 382 of the parallelepiped $G_{i\beta}$ that is intersected by facet $F_\alpha$. As noted above, the intersected portion is denoted as $V_{i\alpha}(\beta)$. Using this term, the flux of state i particles between a facet $F_\beta$ and a facet $F_\alpha$ may be described as:

$$\Gamma_{i\alpha}(\beta, t-1) = \Gamma_i(\beta) V_{i\alpha}(\beta) / V_{i\alpha} \qquad \text{Eq. (I.13)}$$

where $\Gamma_i(\beta, t-1)$ is a measure of the state i particles produced by the facet $F_\beta$ during the previous time increment. From this, for each state i directed toward a facet $F\alpha$ ($c_i n_\alpha < 0$), the number of particles provided to the facet $F_\alpha$ by the other facets is:

$$\Gamma_{i\alpha F \to F} = \Sigma_\beta \Gamma_{i\alpha}(\beta) = \Sigma_\beta \Gamma_i(\beta, t-1) V_{i\alpha}(\beta) / V_{i\alpha} \qquad \text{Eq. (I.14)}$$

and the total flux of state i particles into the facet is:

$$\Gamma_{iIN}(\alpha) = \Gamma_{i\alpha F \to F} + \Gamma_{i\alpha F \to F} = \Sigma_x N_i(x) V_{i\alpha} + \Sigma_\beta \Gamma_i(\beta, t-1) V_{i\alpha}(\beta) / V_{i\alpha} \qquad \text{Eq. (I.15)}$$

The state vector $N(\alpha)$ for the facet, also referred to as a facet distribution function, has M entries corresponding to the M entries of the voxel states vectors. M is the number of discrete lattice speeds. The input states of the facet distribution function $N(\alpha)$ are set equal to the flux of particles into those states divided by the volume $V_{i\alpha}$:

$$N_i(\alpha) = \Gamma_{iIN}(\alpha) / V_{i\alpha} \qquad \text{Eq. (I.16)}$$

for $c_i n_\alpha < 0$.

The facet distribution function is a simulation tool for generating the output flux from a facet, and is not necessarily representative of actual particles. To generate an accurate output flux, values are assigned to the other states of the distribution function. Outward states are populated using the technique described above for populating the inward states:

$$N_i(\alpha) = \Gamma_{iOTHER}(\alpha) / V_{i\alpha} \qquad \text{Eq. (I.17)}$$

for $c_i n_\alpha \geq 0$, wherein $\Gamma_{iOTHER}(\alpha)$ is determined using the technique described above for generating $\Gamma_{iIN}(\alpha)$, but applying the technique to states ($c_i n_\alpha \geq 0$) other than incoming states ($c_i n_\alpha < 0$). In an alternative approach, $\Gamma_{iOTHER}(\alpha)$ may be generated using values of $\Gamma_{iOUT}(\alpha)$ from the previous time step so that:

$$\Gamma_{iOTHER}(\alpha, t) = \Gamma_{iOUT}(\alpha, t-1). \qquad \text{Eq. (I.18)}$$

For parallel states ($c_i n_\alpha = 0$), both $V_{i\alpha}$ and $V_{i\alpha}(x)$ are zero. In the expression for $N_i(\alpha)$, $V_{i\alpha}(x)$ appears in the numerator (from the expression for $\Gamma_{iOTHER}(\alpha)$ and $V_{i\alpha}$ appears in the denominator (from the expression for $N_i(\alpha)$). Accordingly, $N_i(\alpha)$ for parallel states is determined as the limit of $N_i(\alpha)$ as $V_{i\alpha}$ and $V_{i\alpha}(x)$ approach zero. The values of states having zero velocity (i.e., rest states and states (0, 0, 0, 2) and (0, 0, 0, −2)) are initialized at the beginning of the simulation based on initial conditions for temperature and pressure. These values are then adjusted over time.

4. Perform Facet Surface Dynamics

Next, surface dynamics are performed for each facet to satisfy the four boundary conditions discussed above (step 282). A procedure for performing surface dynamics for a facet is illustrated in FIG. 20. Initially, the combined momentum normal to the facet $F_\alpha$ is determined (step 392) by determining the combined momentum $P(\alpha)$ of the particles at the facet as:

$$P(\alpha) = \Sigma_i c_i * N_i^\alpha \qquad \text{Eq. (I.19)}$$

for all i. From this, the normal momentum $P_n(\alpha)$ is determined as:

$$P_n(\alpha) = n_\alpha \cdot P(\alpha).\qquad \text{Eq. (I.20)}$$

This normal momentum is then eliminated using a pushing/pulling technique (step 394) to produce $N_{n-}(\alpha)$. According to this technique, particles are moved between states in a way that affects only normal momentum. The pushing/pulling technique is described in U.S. Pat. No. 5,594,671, which is incorporated by reference.

Thereafter, the particles of $N_{n-}(\alpha)$ are collided to produce a Boltzmann distribution $N_{n-\beta}(\alpha)$ (step 396). As described below with respect to performing fluid dynamics, a Boltzmann distribution may be achieved by applying a set of collision rules to $N_{n-}(\alpha)$.

An outgoing flux distribution for the facet $F_\alpha$ is determined (step 398) based on the incoming flux distribution and the Boltzmann distribution. First, the difference between the incoming flux distribution $\Gamma_i(\alpha)$ and the Boltzmann distribution is determined as:

$$\Delta\Gamma_i(\alpha) = \Gamma_{iIN}(\alpha) - N_{n-\beta i}(\alpha)V_{i\alpha}\qquad \text{Eq. (I.21)}$$

Using this difference, the outgoing flux distribution is:

$$\Gamma_{iOUT}(\alpha) = N_{n-\beta i}(\alpha)V_{i\alpha} - \Delta\Gamma_i^*(\alpha),\qquad \text{Eq. (I.22)}$$

for $n_\alpha c_i > 0$ and where $i^*$ is the state having a direction opposite to state i. For example, if state i is (1, 1, 0, 0), then state $i^*$ is (−1, −1, 0, 0). To account for skin friction and other factors, the outgoing flux distribution may be further refined to:

$$\Gamma_{iOUT}(\alpha) = N_{n-Bi}(\alpha)V_{i\alpha} - \Delta\Gamma_i^*(\alpha) + C_f(n_\alpha \cdot c_i) - [N_{n-\beta i}^*(\alpha) - N_{n-\beta i}(\alpha)]V_{i\alpha} + (n_\alpha \cdot c_i)(t_{1\alpha} \cdot c_i)\Delta N_{j,1}V_{i\alpha} + (n_\alpha \cdot c_i)(t_{2\alpha} \cdot c_i)\Delta N_{j,2}V_{i\alpha} \qquad \text{Eq. (I.23)}$$

for $n_\alpha c_i > 0$, where $C_f$ is a function of skin friction, $t_{i\alpha}$ is a first tangential vector that is perpendicular to $n_\alpha$, $t_{2\alpha}$ is a second tangential vector that is perpendicular to both $n_\alpha$ and $t_{1\alpha}$, and $\Delta N_{j,1}$ and $\Delta N_{j,2}$ are distribution functions corresponding to the energy (j) of the state i and the indicated tangential vector. The distribution functions are determined according to:

$$\Delta N_{j,1,2} = -\frac{1}{2j^2}(n_\alpha \sum_i c_i c_i N_{n-Bi}(\alpha) \cdot t_{1,2\alpha}) \qquad \text{Eq. (I.24)}$$

where j equals 1 for energy level 1 states and 2 for energy level 2 states.

The functions of each term of the equation for $\Gamma_{iOUT}(\alpha)$ are as follows. The first and second terms enforce the normal momentum flux boundary condition to the extent that collisions have been effective in producing a Boltzmann distribution, but include a tangential momentum flux anomaly. The fourth and fifth terms correct for this anomaly, which may arise due to discreteness effects or non-Boltzmann structure due to insufficient collisions. Finally, the third term adds a specified amount of skin fraction to enforce a desired change in tangential momentum flux on the surface. Generation of the friction coefficient $C_f$ is described below. Note that all terms involving vector manipulations are geometric factors that may be calculated prior to beginning the simulation.

From this, a tangential velocity is determined as:

$$u_i(\alpha) = (P(\alpha) - P_n(\alpha)n_\alpha)/\rho,\qquad \text{Eq. (I.25)}$$

where $\rho$ is the density of the facet distribution:

$$\rho = \sum_i N_i(\alpha)\qquad \text{Eq. (I.26)}$$

As before, the difference between the incoming flux distribution and the Boltzmann distribution is determined as:

$$\Delta\Gamma_i(\alpha) = \Gamma_{iIN}(\alpha) - N_{n-\beta i}(\alpha)V_{i\alpha}.\qquad \text{Eq. (I.27)}$$

The outgoing flux distribution then becomes:

$$\Gamma_{iOUT}(\alpha) = N_{n-\beta i}(\alpha)V_{i\alpha} - \Delta\Gamma_i^*(\alpha) + C_f(n_\alpha c_i)[N_{n-\beta i}^*(\alpha) - N_{n-\beta i}(\alpha)]V_{i\alpha},\qquad \text{Eq. (I.28)}$$

which corresponds to the first two lines of the outgoing flux distribution determined by the previous technique but does not require the correction for anomalous tangential flux.

Using either approach, the resulting flux-distributions satisfy all of the momentum flux conditions, namely:

$$\sum_{i,c_i \cdot n_\alpha > 0} c_i \Gamma_{i\alpha OUT} - \sum_{i,c_i \cdot n_\alpha < 0} c_i \Gamma_{i\alpha IN} = \rho_\alpha n_\alpha A_\alpha - C_i \rho_\alpha u_i A_\alpha \qquad \text{Eq. (I.29)}$$

where $p_\alpha$ is the equilibrium pressure at the facet $F_\alpha$ and is based on the averaged density and temperature values of the voxels that provide particles to the facet, and $u_\alpha$ is the average velocity at the facet.

To ensure that the mass and energy boundary conditions are met, the difference between the input energy and the output energy is measured for each energy level j as:

$$\Delta\Gamma_{\alpha mj} = \sum_{i,c_{ji} \cdot n_\alpha < 0} \Gamma_{\alpha jiIN} - \sum_{i,c_{ji} \cdot n_\alpha > 0} \Gamma_{\alpha jiOUT} \qquad \text{Eq. (I.30)}$$

where the index j denotes the energy of the state i. This energy difference is then used to generate a difference term:

$$\Delta\Gamma_{\alpha ji} = V_{i\alpha}\Delta\Gamma_{\alpha mj'} \sum_{i,c_{ji} \cdot n_\alpha < 0} V_{i\alpha} \qquad \text{Eq. (I.31)}$$

for $c_{ji} n_\alpha > 0$. This difference term is used to modify the outgoing flux so that the flux becomes:

$$\Gamma_{\alpha jiOUTf} = \Gamma_{\alpha jiOUT} + \delta\Gamma_{\alpha ji}\qquad \text{Eq. (I.32)}$$

for $c_{ji} n_\alpha > 0$. This operation corrects the mass and energy flux while leaving the tangential momentum flux unaltered. This adjustment is small if the flow is approximately uniform in the neighborhood of the facet and near equilibrium. The resulting normal momentum flux, after the adjustment, is slightly altered to a value that is the equilibrium pressure based on the neighborhood mean properties plus a correction due to the non-uniformity or non-equilibrium properties of the neighborhood.

5. Move from Voxels to Voxels

Referring again to FIG. 11, particles are moved between voxels along the three-dimensional rectilinear lattice (step 284). This voxel to voxel movement is the only movement operation performed on voxels that do not interact with the facets (i.e., voxels that are not located near a surface). In typical simulations, voxels that are not located near enough to a surface to interact with the surface constitute a large majority of the voxels.

Each of the separate states represents particles moving along the lattice with integer speeds in each of the three dimensions: x, y, and z. The integer speeds include: 0, ±1, and ±2. The sign of the speed indicates the direction in which a particle is moving along the corresponding axis.

For voxels that do not interact with a surface, the move operation is computationally quite simple. The entire population of a state is moved from its current voxel to its destination voxel during every time increment. At the same time, the particles of the destination voxel are moved from that voxel to their own destination voxels. For example, an energy level 1 particle that is moving in the +1x and +1y direction (1, 0, 0) is moved from its current voxel to one that is +1 over in the x direction and 0 for other direction. The particle ends up at its destination voxel with the same state it had before the move (1,0,0). Interactions within the voxel will likely change the particle count for that state based on local interactions with other particles and surfaces. If not, the particle will continue to move along the lattice at the same speed and direction.

The move operation becomes slightly more complicated for voxels that interact with one or more surfaces. This can result in one or more fractional particles being transferred to a facet. Transfer of such fractional particles to a facet results in fractional particles remaining in the voxels. These fractional particles are transferred to a voxel occupied by the facet.

Referring to FIG. 17, when a portion 360 of the state i particles for a voxel 362 is moved to a facet 364 (step 278), the remaining portion 366 is moved to a voxel 368 in which the facet 364 is located and from which particles of state i are directed to the facet 364. Thus, if the state population equaled 25 and $V_{i\alpha}(x)$ equaled 0.25 (i.e., a quarter of the voxel intersects the parallelepiped $G_{i\alpha}$), then 6.25 particles would be moved to the facet $F_\alpha$ and 18.75 particles would be moved to the voxel occupied by the facet $F_\alpha$. Because multiple facets could intersect a single voxel, the number of state i particles transferred to a voxel N(f) occupied by one or more facets is:

$$N_i(f) = N_i(x)(1 - \sum_\alpha V_{i\alpha}(x))$$

Eq. (I.33)

where N(x) is the source voxel.

6. Scatter from Facets to Voxels

Next, the outgoing particles from each facet are scattered to the voxels (step 286). Essentially, this step is the reverse of the gather step by which particles were moved from the voxels to the facets. The number of state i particles that move from a facet $F_\alpha$ to a voxel N(x) is:

$$N_{\alpha i F \to V} = \frac{1}{P_f(x)} V_{i\alpha}(x) \Gamma_{\alpha i OUT_f} / V_{\alpha i}$$

Eq. (I.34)

where $P_f(x)$ accounts for the volume reduction of partial voxels. From this, for each state i, the total number of particles directed from the facets to a voxel $N_{(x)}$ is:

$$N_{iF \to V} = \frac{1}{P_f(x)} \sum_\alpha V_{\alpha i}(x) \Gamma_{\alpha i OUT_f} / V_{\alpha i}$$

Eq. (I.35)

After scattering particles from the facets to the voxels, combining them with particles that have advected in from surrounding voxels, and integerizing the result, it is possible that certain directions in certain voxels may either underflow (become negative) or overflow (exceed 255 in an eight-bit implementation). This would result in either a gain or loss in mass, momentum and energy after these quantities are truncated to fit in the allowed range of values. To protect against such occurrences, the mass, momentum and energy that are out of bounds are accumulated prior to truncation of the offending state. For the energy to which the state belongs, an amount of mass equal to the value gained (due to underflow) or lost (due to overflow) is added back to randomly (or sequentially) selected states having the same energy and that are not themselves subject to overflow or underflow. The additional momentum resulting from this addition of mass and energy is accumulated and added to the momentum from the truncation. By only adding mass to the same energy states, both mass and energy are corrected when the mass counter reaches zero. Finally, the momentum is corrected using pushing/pulling techniques until the momentum accumulator is returned to zero.

7. Perform Fluid Dynamics

Fluid dynamics are performed (step 288) FIG. 11. This step may be referred to as microdynamics or intravoxel operations. Similarly, the advection procedure may be referred to as intervoxel operations. The microdynamics operations described below may also be used to collide particles at a facet to produce a Boltzmann distribution.

The fluid dynamics is ensured in the lattice Boltzmann equation models by a particular collision operator known as the BGK collision model. This collision model mimics the dynamics of the distribution in a real fluid system. The collision process can be well described by the right-hand side of Equation 1 and Equation 2. After the advection step, the conserved quantities of a fluid system, specifically the density, momentum and the energy are obtained from the distribution function using Equation 3. From these quantities, the equilibrium distribution function, noted by $f^{eq}$ in equation (2), is fully specified by Equation (4). The choice of the velocity vector set $c_i$, the weights, both are listed in Table 1, together with Equation 2 ensures that the macroscopic behavior obeys the correct hydrodynamic equation.

Variable Resolution

Variable resolution (as discussed in US 2013/0151221 A1) can also be employed and would use voxels of different sizes, e.g., coarse voxels and fine voxels.

By leveraging the unique transient Lattice Boltzmann-based physics, the system can perform simulations that accurately predict real-world conditions. For example, engineers evaluate product performance early in the design process before any prototype being built, when the impact of the change is most significant for design and budgets. The system can use the CAD geometry to accurately and efficiently performs aerodynamic, aero-acoustic and thermal management simulations. The system can perform simulations to address such applications as: aerodynamics (aerodynamic efficiency; vehicle handling; soiling and water management; panel deformation; driving dynamics), aeroacoustics (greenhouse wind noise; underbody wind noise; gap/seal noise; mirror, whistle and tonal noise; sunroof and window buffeting; pass-by/community noise; cooling fan noise), thermal management (cooling airflow; thermal protection; brake cooling; drive cycle simulation; key-off and soak; electronics and battery cooling; ROA/intake ports), climate control (cabin comfort; HVAC unit & distribution system performance; HVAC system and fan noise; defrost and demist), powertrain: (drivetrain cooling; exhaust systems; cooling jacket; engine block), soiling and water management (a pillar overflow, dirt and dust accumulation, tire spray).

Embodiments of the subject matter and the functional operations described in this specification can be implemented in digital electronic circuitry, tangibly-embodied computer software or firmware, computer hardware (including the structures disclosed in this specification and their structural equivalents), or in combinations of one or more of them. Embodiments of the subject matter described in this specification can be implemented as one or more computer programs (i.e., one or more modules of computer program instructions encoded on a tangible non-transitory program carrier for execution by, or to control the operation of, data processing apparatus). The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry (e.g., an FPGA (field programmable gate array) or an ASIC (application-specific integrated circuit)). In addition to hardware, the apparatus can optionally include code that produces an execution environment for computer programs (e.g., code that constitutes processor firmware, a protocol stack, a database management system, an operating system, or a combination of one or more of them).

A computer program, which can also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or another unit suitable for use in a computing environment. A computer program may, but need not, correspond to a file in a file system. A program can be stored in a portion of a file that holds other programs or data (e.g., one or more scripts stored in a markup language document, in a single file dedicated to the program in question, or in multiple coordinated files (e.g., files that store one or more modules, subprograms, or portions of code)). A computer program can be deployed so that the program is executed on one computer or on multiple computers that are located at one site or distributed across multiple sites and interconnected by a data communication network.

Computers suitable for the execution of a computer program can be based on general or special purpose microprocessors or both, or any other kind of central processing unit. Computer-readable media suitable for storing computer program instructions and data include all forms of non-volatile memory on media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

Embodiments of the subject matter described in this specification can be implemented in a computing system that includes a back-end component (e.g., as a data server), or that includes a middleware component (e.g., an application server), or that includes a front-end component (e.g., a client computer having a graphical user interface or a web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device), which acts as a client. Data generated at the user device (e.g., a result of the user interaction) can be received from the user device at the server.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A computer implemented method comprises:
receiving by a computer system from a graphical user interface, a selection of single surface of a computer aided design (CAD) generated geometry that shares a boundary with a void space that will be discretized into a mesh, and which CAD generated geometry occupies a volume in a fluid region that defines an extent of the fluid region;
producing by the computer system from the CAD generated geometry a virtual geometry item that is positioned within or about the void region to define the volume to be discretized;
positioning by the computer system the virtual geometry item along an axis of symmetry of the CAD generated geometry;
storing by the computer system in memory identifiable information about the virtual geometry item which information includes coordinates of a point on the virtual geometry item and a normal vector to the virtual geometry item;
validating by the computer system a sample point as a valid seed point within the CAD generated geometry that satisfies the produced virtual geometry; and
propagating by the computer system from the valid seed point the mesh within the defined volume by discretizing the CAD generated geometry by a discretization value.

2. The computer-implemented method of claim 1 wherein when the valid point is not found within the CAD generated geometry, which satisfies all bounding planes taken together, the method further comprise:
refining the discretization value by incrementing the discretization value; and
repeating until a valid seed point is found.

3. The computer-implemented method of claim 1 further comprise:
   identifying a void region in a computer aided design (CAD) generated geometry within which the mesh is applied.
4. The computer-implemented method of claim 1, further comprises:
   parametrizing the stored information to modify the dimensions or orientation of the virtual geometries.
5. The computer-implemented method of claim 1 wherein the virtual geometry item is a plane.
6. The computer-implemented method of claim 1 wherein the virtual geometry item is a box.
7. The computer-implemented method of claim 1 wherein the method performs a discretization of the volume.
8. The computer-implemented method of claim 1 further comprising:
   performing a computational fluid dynamic simulation of the volume.
9. A system comprises:
   one or more processing devices;
   memory operatively coupled to the one or more processor devices; and
   one or more storage devices storing instructions that are operable, when executed by the one or more processing devices, to configure the system to:
      receive by the one or more processing devices from a graphical user interface, a selection of a single surface of a computer aided design (CAD) generated geometry as a surface that shares a boundary with a void space that will be discretized;
      produce from the CAD generated geometry a virtual geometry item that is positioned within or about the void region to define the volume to be discretized;
      position the virtual geometry item along an axis of symmetry of the CAD generated geometry;
      store in memory identifiable information about the virtual geometry item which information includes coordinates of a point on the virtual geometry item and a normal vector to the virtual geometry item;
      validate by the computer system a sample point as a valid seed point within the CAD generated geometry that satisfies the produced virtual geometry; and
      propagate from the valid seed point a mesh within the defined volume by discretizing the CAD generated geometry by a discretization value.
10. The system of claim 9 wherein when the valid point is not found within the CAD generated geometry, which satisfies all bounding planes taken together, the system further comprises instructions to:
   refine the discretization value by incrementing the discretization value; and
   repeat until a valid seed point is found.
11. The system of claim 9 further comprises instructions to:
   identify a void region in a computer aided design (CAD) generated geometry within which the mesh is applied; when no inner point is found, propagate to a next surface sharing a boundary with the void space and repeat until a valid inner point is found.
12. The system of claim 9 further comprises instructions to:
   parametrizing the stored information to modify the dimensions or orientation of the virtual geometries.
13. The system of claim 9 wherein the virtual geometry item is a plane.
14. The system of claim 9 wherein the virtual geometry item is a box.
15. The system of claim 9 further comprises instructions to:
   perform a discretization of the volume.
16. The system of claim 9 further comprises instructions to:
   perform a computational fluid dynamic simulation of the volume.
17. A computer program product tangibly stored on a non-transitory hardware storage device for identifying gaps in a computer aided design figure, the computer program product comprising instructions that are operable, when executed by a system to cause the system to:
   receive by the one or more processing devices from a graphical user interface, a selection of a single surface of a computer aided design (CAD) generated geometry as a surface that shares a boundary with a void space that will be discretized;
   produce from the CAD generated geometry a virtual geometry item that is positioned within or about the void region to define the volume to be discretized;
   position the virtual geometry item along an axis of symmetry of the CAD generated geometry;
   store in memory identifiable information about the virtual geometry item which information includes coordinates of a point on the virtual geometry item and a normal vector to the virtual geometry item;
   validate by the computer system a sample point as a valid seed point within the CAD generated geometry that satisfies the produced virtual geometry; and
   propagate from the valid seed point a mesh within the defined volume by discretizing the CAD generated geometry by a discretization value.
18. The product of claim 17 wherein when the valid point is not found within the CAD generated geometry, which satisfies all bounding planes taken together, the system further comprises instructions to:
   refine the discretization value by incrementing the discretization value; and
   repeat until a valid seed point is found.
19. The product of claim 17 further comprises instructions to:
   identify a void region in a computer aided design (CAD) generated geometry within which the mesh is applied.
20. The system of claim 17 further comprises instructions to:
   parametrizing the stored information to modify the dimensions or orientation of the virtual geometries.

* * * * *